US012738499B2

(12) United States Patent
Seda et al.

(10) Patent No.: US 12,738,499 B2
(45) Date of Patent: Sep. 15, 2026

(54) MODIFIED SULFIDE SOLID ELECTROLYTE AND PRODUCTION METHOD FOR SAME, AND ELECTRODE COMBINED MATERIAL AND LITHIUM-ION BATTERY

(71) Applicant: IDEMITSU KOSAN CO., LTD., Tokyo (JP)

(72) Inventors: Keita Seda, Tokyo (JP); Tomoyuki Okuyama, Tokyo (JP); Takamoto Morita, Tokyo (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 76 days.

(21) Appl. No.: 18/851,106

(22) PCT Filed: Mar. 28, 2023

(86) PCT No.: PCT/JP2023/012709

§ 371 (c)(1),
(2) Date: Sep. 26, 2024

(87) PCT Pub. No.: WO2023/190625

PCT Pub. Date: Oct. 5, 2023

(65) Prior Publication Data

US 2025/0253333 A1 Aug. 7, 2025

(30) Foreign Application Priority Data

Mar. 30, 2022 (JP) ................................ 2022-057537

(51) Int. Cl.
*H01M 4/62* (2006.01)
*H01M 4/13* (2010.01)
*H01M 10/0525* (2010.01)

(52) U.S. Cl.
CPC .............. *H01M 4/62* (2013.01); *H01M 4/13* (2013.01); *H01M 10/0525* (2013.01)

(58) Field of Classification Search
None
See application file for complete search history.

(56) References Cited

U.S. PATENT DOCUMENTS 11,572,459 B2 * 2/2023 Burdynska ............... C08K 3/30
11,658,337 B2 * 5/2023 Shibata ............... H01M 10/052 429/188

(Continued)

FOREIGN PATENT DOCUMENTS

JP 2012226854 A * 11/2012
JP 2014212065 A 11/2014

(Continued)

OTHER PUBLICATIONS

Abstract of JP 2012-226854 A (Year: 2012).*

(Continued)

*Primary Examiner* — Kevin M Bernatz
(74) *Attorney, Agent, or Firm* — Element IP, PLC

(57) ABSTRACT

Provided are: a modified sulfide solid electrolyte containing a sulfide solid electrolyte having a BET specific surface area of 10 $m^2/g$ or more and containing a lithium atom, a sulfur atom, a phosphorus atom, and a halogen atom, and a compound having two or more heterocyclic rings each having a carbon atom and an oxygen atom; and a method for producing the modified sulfide solid electrolyte, which has excellent coating suitability when coated as a paste and is capable of efficiently exhibiting excellent battery performance even when a sulfide solid electrolyte having a large specific surface area is used. Also provided are an electrode combined material and a lithium-ion battery using the modified sulfide solid electrolyte.

14 Claims, 1 Drawing Sheet

(56) References Cited

U.S. PATENT DOCUMENTS

| | | | | |
|---|---|---|---|---|
| 12,018,131 | B2 * | 6/2024 | Burdynska | H01M 50/403 |
| 2006/0166003 | A1 * | 7/2006 | Khabashesku | C01B 32/156<br>428/408 |
| 2019/0356017 | A1 | 11/2019 | Osada et al. | |
| 2020/0067137 | A1 * | 2/2020 | Van Berkel | H01M 50/446 |
| 2021/0242496 | A1 | 8/2021 | Shibata et al. | |
| 2022/0173428 | A1 | 6/2022 | Morinaka et al. | |
| 2022/0285724 | A1 | 9/2022 | Totsuka et al. | |
| 2024/0105985 | A1 * | 3/2024 | Okuyama | H01B 1/10 |

FOREIGN PATENT DOCUMENTS

| | | | |
|---|---|---|---|
| JP | 2017147173 | A | 8/2017 |
| JP | 2019199394 | A | 11/2019 |
| JP | 2020087633 | A | 6/2020 |
| WO | WO-2020105736 | A1 | 5/2020 |
| WO | WO-2020203231 | A1 | 10/2020 |
| WO | WO-2021029315 | A1 | 2/2021 |

OTHER PUBLICATIONS

International Search Report issued May 30, 2023, in PCT/JP2023/012709 (with English translation), 5 pages.

Written Opinion of the International Searching Authority issued May 30, 2023, in PCT/JP2023/012709 (with English translation), 6 pages.

* cited by examiner

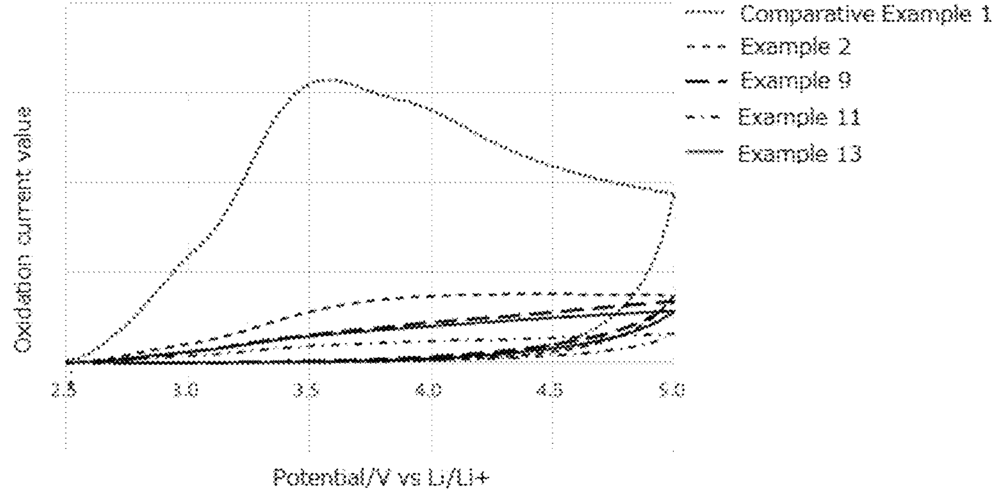
Comparative Example 1
Example 2
Example 9
Example 11
Example 13
Oxidation current value
2.5
3.0
3.5
4.0
4.5
5.0
Potential/V vs Li/Li+

MODIFIED SULFIDE SOLID ELECTROLYTE AND PRODUCTION METHOD FOR SAME, AND ELECTRODE COMBINED MATERIAL AND LITHIUM-ION BATTERY

TECHNICAL FIELD

The present invention relates to a modified sulfide solid electrolyte and a method for producing the same, and to an electrode combined material and a lithium-ion battery.

BACKGROUND ART

With the rapid spread of information-related devices and communication devices such as personal computers, video cameras, and cellular phones in recent years, the development of batteries to be used as power sources thereof has been emphasized. In particular, lithium-ion batteries are attracting attention from the viewpoint of high energy density.

Conventionally, since an electrolytic solution containing a combustible organic solvent is used in a battery used for such an application, it is necessary to attach a safety device for suppressing a temperature rise at the time of a short circuit, and to improve a structure and a material for preventing a short circuit. On the other hand, a battery in which the electrolytic solution is replaced with a solid electrolyte layer has been developed, since the battery is entirely solidified by replacing the electrolytic solution with a solid electrolyte, a combustible organic solvent is not used in the battery, the safety device can be simplified, and the battery is excellent in production cost and productivity.

As a solid electrolyte used for the solid electrolyte layer, a sulfide solid electrolyte has been conventionally known, and the sulfide solid electrolyte is primarily desired to have improved ion conductivity. For example, in order to improve ion conductivity, a method for producing a composite solid electrolyte in which the surface of a sulfide-based solid electrolyte is coated with a predetermined halogenated hydrocarbon compound as a coating material has been proposed (for example, see PTL 1).

As a technique for coating a surface, for example, PTL 2 discloses a solid electrolyte composition in which a coating film is formed on a surface of a sulfide solid electrolyte by a compound having a C═O bond or a compound having an S═O bond in order to improve cycle characteristics by increasing affinity between the sulfide solid electrolyte and an active material used for a negative electrode, a positive electrode, or the like when a lithium-ion battery is produced. Further, PTL 3 discloses a sulfide solid electrolyte containing a lithium element, a phosphorus element, and a sulfur element and also containing an ester compound of a carboxylic acid and an alcohol, in which the ester compound is bonded to or adsorbed on the surface of the conductive sulfide and can improve the cycle characteristics of a solid battery, and the sulfide solid electrolyte is obtained by a production method including a step of wet-pulverizing a slurry containing a lithium ion-conductive sulfide, an organic solvent, and an ester compound.

Furthermore, for example, PTL 4 discloses a method for producing a solid electrolyte in which an anionic surfactant which is a monomer or an oligomer such as a sulfosuccinic acid ester salt or a benzenesulfonic acid salt, a solvent, and a sulfide solid electrolyte are mixed and then the solvent is removed, and a solid electrolyte containing a predetermined amount of the surfactant per specific surface area. In addition. PTL 4 discloses that the use of the surfactant provides a sulfide solid electrolyte in which the generation of hydrogen sulfide and the coarsening of particle diameters are suppressed.

As described above, in recent years, in order to put a lithium-ion battery into practical use, there have been diversified demands not only for improving the ion conductivity of the sulfide solid electrolyte itself but also for improving other performance. In order to meet such demands, a technique of coating a surface is applied.

CITATION LIST

Patent Literature

PTL 1: JP 2020-87633 A
PTL 2: JP 2017-147173 A
PTL 3: WO 2020/203231
PTL 4: WO 2021/029315

SUMMARY OF INVENTION

Technical Problem

The present invention has been made in view of such circumstances, and an object of the present invention is to provide a modified sulfide solid electrolyte and a method for producing the same, in which even a sulfide solid electrolyte having a large specific surface area is excellent in coating suitability when coated as a paste, and can efficiently exhibit excellent battery performance. Another object of the present invention is to provide an electrode combined material and a lithium-ion battery that exhibit excellent battery performance.

Solution to Problem

A modified sulfide solid electrolyte according to the present invention is a modified sulfide solid electrolyte containing: a sulfide solid electrolyte having a BET specific surface area of 10 $m^2/g$ or more and containing a lithium atom, a sulfur atom, a phosphorus atom, and a halogen atom; and a compound having two or more heterocyclic rings each having a carbon atom and an oxygen atom.

Further, a method for producing a modified sulfide solid electrolyte according to the present invention is a method for producing a modified sulfide solid electrolyte, the method including: mixing a sulfide solid electrolyte having a BET specific surface area of 10 $m^2/g$ or more and containing a lithium atom, a sulfur atom, a phosphorus atom, and a halogen atom, a compound having two or more heterocyclic rings each having a carbon atom and an oxygen atom, and an organic solvent; and removing the organic solvent.

An electrode combined material according to the present invention is an electrode combined material including the modified sulfide solid electrolyte according to the present invention and an electrode active material.

In addition, a lithium-ion battery according to the present invention is a lithium-ion battery including at least one of the modified sulfide solid electrolyte according to the present invention and the electrode combined material according to the present invention.

Advantageous Effects of Invention

According to the present invention, it is possible to provide a modified sulfide solid electrolyte having excellent coating suitability when coated as a paste and capable of efficiently exhibiting excellent battery performance, and a method for producing the modified sulfide solid electrolyte. In addition, according to the present invention, it is possible to provide an electrode combined material and a lithium-ion battery that exhibit excellent battery performance.

BRIEF DESCRIPTION OF DRAWINGS

FIG. 1 is a CV curve of each of the modified sulfide solid electrolytes of Examples 2, 9, 11, and 13 and the sulfide solid electrolyte of Comparative Example 1.

DESCRIPTION OF EMBODIMENTS

Hereinafter, an embodiment of the present invention (hereinafter, may be referred to as "the present embodiment") will be described. In the description herein, the numerical values of the upper limit and the lower limit related to the numerical ranges of "X or more" and "Y or less", and "X to Y" are numerical values that can be arbitrarily combined, and the numerical values of the Examples can also be used as the numerical values of the upper limit and the lower limit.

(Findings Obtained by the Inventor to Arrive at the Present Invention)

As a result of intensive studies to solve the above-mentioned problems, the present inventors have found the following matters and completed the present invention.

As described in PTLs 1 to 4, a technique of coating a surface of a sulfide solid electrolyte with a certain compound has been conventionally present. PTLs 1 to 4 have a problem to be solved of improving battery performance such as improving ion conductivity and improving cycle characteristics by increasing affinity between a sulfide solid electrolyte and an active material used for a negative electrode, a positive electrode, or the like in producing a lithium-ion battery by using the technique.

In the production process of a lithium-ion battery (also referred to as an "all-solid battery"), a solid electrolyte, other predetermined components, and a solvent are mixed to prepare a paste, and the paste is coated to form a separator layer and an electrode combined material layer. In order to improve the performance of these layers, it is necessary to improve the density of the solid electrolyte constituting these layers, and it is effective to use a solid electrolyte having a large specific surface area to improve the density.

As described above, there is a demand for using a solid electrolyte having a large specific surface area. However, when the specific surface area of the solid electrolyte is large, the viscosity of the paste is increased, and there is a production problem in that the coating suitability is significantly reduced. On the other hand, when the viscosity of the paste is reduced by using a large amount of a solvent, the coating suitability of the paste can be improved, but there is a problem in that the battery performance is reduced due to an increase in drying time and a reduction in density of the solid electrolyte constituting the layer. Therefore, the coating suitability of the paste and the achievement of high battery performance are in a trade-off relationship. In addition, sulfide solid electrolytes having a large specific surface area of 10 $m^2/g$ or more have a high viscosity when formed into a paste, which not only leads to a significant decrease in coating suitability, but also requires a large amount of solvents in order to reduce the viscosity of the paste, which leads to an increase in drying time and a significant decrease in battery performance due to a decrease in density.

As in PTLs 1 to 4, many studies have been made to improve ion conductivity and battery performance. However, in a situation in which practical use of lithium-ion batteries is rapidly progressing, the present inventors have paid attention to mass production, and have paid attention to the fact that a method of improving performance in a production process, such as coating suitability of a paste, has not been examined at all.

The present inventors have continued intensive studies focusing on compounds to be coated on surfaces of sulfide solid electrolytes while following techniques for coating the surfaces of the sulfide solid electrolytes with any compound as disclosed in PTLs 1 to 4, and have found that even sulfide solid electrolytes having a large specific surface area of 10 $m^2/g$ or more can be sulfide solid electrolytes which are excellent in coating suitability when coated as a paste and can efficiently exhibit excellent battery performance by adhering a compound having two or more heterocyclic rings each having a carbon atom and an oxygen atom to the surfaces thereof. It is a surprising phenomenon that has not been recognized at all so far that the effect of excellent coating suitability when coated as a paste can be obtained even in a sulfide solid electrolyte having a large specific surface area of 10 $m^2/g$ or more by adhering a compound having two or more heterocyclic rings each having a carbon atom and an oxygen atom to the surface of the sulfide solid electrolyte.

In the description herein, the term "solid electrolyte" refers to an electrolyte that maintains solid at 25° C. under a nitrogen gas atmosphere. The "sulfide solid electrolyte" obtained by the production method of the present embodiment is a solid electrolyte that contains a lithium atom, a sulfur atom, a phosphorus atom, and a halogen atom and has ion conductivity caused by the lithium atom.

The "sulfide solid electrolyte" includes both a crystalline sulfide solid electrolyte having a crystal structure and an amorphous sulfide solid electrolyte. In the description herein, the crystalline sulfide solid electrolyte is a solid electrolyte in which a peak derived from the solid electrolyte is observed in an X-ray diffraction pattern in powder X-ray diffraction (XRD) measurement, and is a material regardless of the presence or absence of a peak derived from a raw material of the solid electrolyte in these. That is, the crystalline sulfide solid electrolyte contains a crystal structure derived from the solid electrolyte, and a part thereof may be a crystal structure derived from the solid electrolyte, or the whole thereof may be a crystal structure derived from the solid electrolyte. The crystalline sulfide solid electrolyte may partially contain an amorphous sulfide solid electrolyte (also referred to as a "glass component") as long as the crystalline sulfide solid electrolyte has the X-ray diffraction pattern as described above. Therefore, the crystalline sulfide solid electrolyte includes so-called glass ceramics obtained by heating an amorphous solid electrolyte (glass component) to a crystallization temperature or higher.

In addition, in the description herein, the amorphous sulfide solid electrolyte (glass component) refers to a solid electrolyte in which an X-ray diffraction pattern in powder X-ray diffraction (XRD) measurement is a halo pattern in which a peak other than a peak derived from a material is not substantially observed, and means that the presence or absence of a peak derived from a raw material of the solid electrolyte does not matter.

The distinction between crystalline and amorphous is applied to both the sulfide solid electrolyte and the modified sulfide solid electrolyte in the present embodiment.

Various Aspects of Present Embodiment

A modified sulfide solid electrolyte according to a first aspect of the present embodiment is a modified sulfide solid electrolyte containing: a sulfide solid electrolyte having a BET specific surface area of 10 $m^2/g$ or more and containing a lithium atom, a sulfur atom, a phosphorus atom, and a halogen atom; and a compound having two or more heterocyclic rings each having a carbon atom and an oxygen atom.

Typical examples of the sulfide solid electrolyte containing a lithium atom, a sulfur atom, a phosphorus atom, and a halogen atom include a sulfide solid electrolyte obtained by a conventional method, for example, a sulfide solid electrolyte obtained by using lithium sulfide, diphosphorus pentasulfide, a lithium halide, a simple substance halogen, or the like as a raw material. That is, the modified sulfide solid electrolyte of the present embodiment contains a sulfide solid electrolyte having a large specific surface area such as a BET specific surface area of 10 $m^2/g$ or more by a conventional method and a compound having two or more heterocyclic rings each having a carbon atom and an oxygen atom (hereinafter, may be referred to as "heteropolycyclic compound").

In the case of a conventional sulfide solid electrolyte having a large specific surface area such as a BET specific surface area of 10 $m^2/g$ or more, it has been extremely difficult to efficiently form a positive electrode, a negative electrode, and an electrolyte layer because a paste containing the sulfide solid electrolyte in an amount necessary for ensuring the density of the solid electrolyte in the layer in order to exhibit a predetermined battery performance has a significantly reduced coating performance. The sulfide solid electrolyte of the present embodiment is a so-called "modified sulfide solid electrolyte" because the coating suitability is dramatically improved, that is, "modified", by containing the conventional sulfide solid electrolyte and the heteropolycyclic compound.

The modified sulfide solid electrolyte of the present embodiment requires a heteropolycyclic compound having two or more heterocyclic rings among heterocyclic compounds. By using the heteropolycyclic compound, there is exhibited an effect that the coating suitability when coated as a paste is excellent, and excellent battery performance can be efficiently exhibited.

In the modified sulfide solid electrolyte of the present embodiment, it is not certain how the heteropolycyclic compound is contained, but it is presumed that the heteropolycyclic compound adheres to the surface of the sulfide solid electrolyte while maintaining its structure. This is because, when the modified sulfide solid electrolyte of the present embodiment is analyzed by FT-IR spectroscopy (ATR method), in the infrared absorption spectrum, in a case where an epoxy compound is used as the heteropolycyclic compound, a peak at 2800 to 3000 $cm^{-1}$ observed in the epoxy compound is confirmed. This is because, since the peak due to the presence of the epoxy compound is clearly detected, it is considered that the epoxy compound is present in an easily detectable form.

In addition, it has been confirmed by Examples that the oil absorption is lower than that of a sulfide solid electrolyte that does not contain a heteropolycyclic compound. It is natural to consider that the reduction in oil absorption is due to the heteropolycyclic compound adhering to the surface of the sulfide solid electrolyte and blocking at least a portion of the pores of the sulfide solid electrolyte. It is generally known that the improvement of coating suitability is related to the oil absorption as well as the specific surface area. It is presumed that when the heteropolycyclic compound adheres to the surface of the sulfide solid electrolyte, the oil absorption is reduced and the coating suitability is improved.

With respect to the adhesion of the heteropolycyclic compound to the surface of the sulfide solid electrolyte, details of the mode of adhesion, that is, whether the adhesion is physical adhesion or chemical adhesion, are also unknown. However, since a hetero atom such as an oxygen atom has a property of being easily bonded to a lithium atom, a halogen atom, or the like, there is a high possibility that the oxygen atoms contained in at least two epoxy groups in the heteropolycyclic compound are bonded to the lithium atom, the halogen atom, or the like constituting the sulfide solid electrolyte and adheres to the surface, that is, chemical adhesion.

In the modified sulfide solid electrolyte of the present embodiment, it is considered that even if the adhesion is any of the above, when the heteropolycyclic compound is adhered to the surface, the oil absorption is easily reduced, and as a result, the coating suitability is improved, and the battery performance can be improved.

According to a second aspect of the present embodiment, in the modified sulfide solid electrolyte according to the first aspect, the compound having two or more heterocyclic rings each having a carbon atom and an oxygen atom is a compound having two or more groups each having an oxirane ring.

As the heteropolycyclic compound used in the modified sulfide solid electrolyte of the present embodiment, any compound having two or more heterocyclic rings each having at least a carbon atom and an oxygen atom can be used without particular limitation. Although details will be described later, typical preferred examples of the heterocyclic ring having a carbon atom and an oxygen atom include heterocyclic rings such as an oxirane ring, an oxetane ring, and a tetrahydrofuran ring. Among these, an oxirane ring is particularly preferred, and by having a group having an oxirane ring, the oil absorption is reduced, excellent coating suitability is easily obtained, and excellent battery performance is more efficiently obtained. As the group having an oxirane ring, which will be described in detail later, an epoxy group, and as the group containing an epoxy group, a glycidyl group and a glycidyl ether group are preferable.

According to a third aspect of the present embodiment, in the modified sulfide solid electrolyte according to the first or second aspect, the compound having two or more heterocyclic rings each having a carbon atom and an oxygen atom is an epoxy compound represented by the following general formula (1) and having at least two or more groups selected from an epoxy group, a glycidyl group, and a glycidyl ether group.

(1)

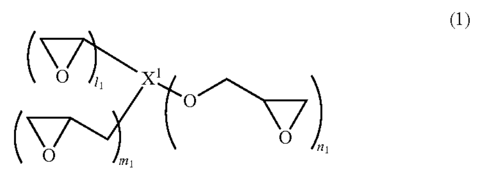

In the general formula (1). $X^1$ is a single bond or an aliphatic group, an alicyclic group, an aromatic group, an organic group having a siloxane structure, or an organic group composed of a combination thereof; $l_1$, $m_1$, and $n_1$ are each an integer of 0 or more and 16 or less, and satisfy $l_1+m_1+n_1 \geq 2$; and when the organic group of $X^1$ has the alicyclic group, the epoxy group may be condensed with an alicyclic ring in the alicyclic group.

As described above, in the modified sulfide solid electrolyte of the present embodiment, any heteropolycyclic compound can be used without particular limitation, that is, excellent coating suitability can be obtained, but by employing an epoxy compound having at least two or more groups selected from an epoxy group, a glycidyl group, and a glycidyl ether group as a group having an oxirane ring as a heterocyclic ring represented by the general formula (1), the oil absorption is reduced, excellent coating suitability can be easily obtained, and excellent battery performance can be more efficiently obtained.

According to a fourth aspect of the present embodiment, in the modified sulfide solid electrolyte according to the third aspect, the group composed of a combination thereof, which is a $X^1$ in the general formula (1), is a group formed by bonding at least two groups selected from the aliphatic group, the alicyclic group, the aromatic group, and the organic group having a siloxane structure by a single bond or a bonding group selected from —O—, —$SO_2$—, —CO—, —C(=O)O—, —N— and —S—.

In the general formula (1), it is specified that $X^1$ can have a single bond or an organic group composed of a combination of an aliphatic group, an alicyclic group, an aromatic group, and an organic group having a siloxane structure, but when these organic groups are combined, in addition to the single bond, an organic group bonded via a bonding group such as —O— is also included. The fourth aspect clarifies this.

According to a fifth aspect of the present embodiment, in the modified sulfide solid electrolyte according to the first to forth aspects, the modified sulfide solid electrolyte has a peak at 2800 to 3000 $cm^{-1}$ in an infrared absorption spectrum obtained by FT-IR spectroscopy (ATR method). Since the peak is not detected from the sulfide solid electrolyte as described above, it is considered that the peak is a peak derived from the heterocyclic compound contained in the modified sulfide solid electrolyte.

In this way, when the heteropolycyclic compound is present so as to be confirmed as a peak in an infrared absorption spectrum by FT-IR spectroscopy (ATR method), the oil absorption is reduced, excellent coating suitability is easily obtained, and excellent battery performance is more efficiently obtained.

According to a sixth aspect of the present embodiment, in the modified sulfide solid electrolyte according to the fifth aspect, the peak detected at 2800 to 3000 $cm^{-1}$ in an infrared absorption spectrum obtained by FT-IR spectroscopy (ATR method) is derived from C—H stretching vibration of an alkyl chain in the heteropolycyclic compound.

As described above, the peak is a peak that is not detected in the sulfide solid electrolyte according to the conventional method, and is a peak that is exhibited by containing the heteropolycyclic compound. Therefore, it is considered that the heteropolycyclic compound is present while maintaining the structure thereof, and the presence of the heteropolycyclic compound in such a form reduces the oil absorption, and thus, excellent coating suitability is easily obtained, and excellent battery performance is more efficiently obtained.

According to a seventh aspect of the present embodiment, the modified sulfide solid electrolyte according to the sixth aspect has a peak of 0.0 to 5.0 ppm derived from the alkyl chain in a $^1$H-NMR spectrum.

The modified sulfide solid electrolyte according to the present embodiment has this peak, and it is considered that the heteropolycyclic compound is present while maintaining its structure in the modified sulfide solid electrolyte. The presence of the heteropolycyclic compound in such a form reduces the oil absorption, and thus, excellent coating suitability is easily obtained, and excellent battery performance is more efficiently obtained.

According to an eighth aspect of the present embodiment, in the modified sulfide solid electrolyte according to the first to seventh aspects, the content of the compound having two or more heterocyclic rings each having a carbon atom and an oxygen atom is 0.03 parts by mass or more and 25 parts by mass or less relative to 100 parts by mass of the sulfide solid electrolyte.

When the content of the compound having two or more heterocyclic rings each having a carbon atom and an oxygen atom (heteropolycyclic compound) is within the above-described range, the heteropolycyclic compound can be appropriately dispersed and adhered to the surface of the sulfide solid electrolyte to reduce the oil absorption, and the lithium ion conductivity can be appropriately maintained, and therefore, the coating suitability is easily improved, and excellent battery performance is easily efficiently exhibited. As for the "content of the compound having two or more heterocyclic rings each having a carbon atom and an oxygen atom", if the amount of the heteropolycyclic compound used in the production of the modified sulfide solid electrolyte is known, the amount used becomes the content as it is.

According to a ninth aspect of the present embodiment, in the modified sulfide solid electrolyte according to the first to eighth aspects, the number average molecular weight of the compound having two or more heterocyclic rings each having a carbon atom and an oxygen atom is 10,000 or less: according to a tenth aspect of the present embodiment, in the modified sulfide solid electrolyte according to the first to ninth aspects, the content of a compound having two or more heterocyclic rings each having a carbon atom and an oxygen atom and having a number average molecular weight of 10,000 or less in the compound having two or more heterocyclic rings each having a carbon atom and an oxygen atom is 90% by mass or more; and according to an eleventh aspect of the present embodiment, in the modified sulfide solid electrolyte according to the first to tenth aspects, the content of the compound having two or more heterocyclic rings each having a carbon atom and an oxygen atom and having a number average molecular weight of more than 10,000 in the compound having two or more heterocyclic rings each having a carbon atom and an oxygen atom is 10% by mass or less.

Since the heteropolycyclic compound used in the modified sulfide solid electrolyte of the present embodiment is a compound having a relatively small number average molecular weight, the oil absorption is reduced, excellent coating suitability is easily obtained, and excellent battery performance is more efficiently obtained. Therefore, it is preferable that the amount of a compound having a relatively large number average molecular weight, that is, a compound having a number average molecular weight of more than 10,000 is small.

A method for producing a modified sulfide solid electrolyte according to a twelfth aspect of the present embodiment includes: mixing a sulfide solid electrolyte having a BET specific surface area of 10 $m^2/g$ or more and containing a lithium atom, a sulfur atom, a phosphorus atom, and a halogen atom, a compound having two or more heterocyclic rings each having a carbon atom and an oxygen atom, and an organic solvent; and removing the organic solvent.

As described above, the method for producing a modified sulfide solid electrolyte of the present embodiment is not particularly limited as long as the modified sulfide solid electrolyte contains a heteropoly cyclic compound, but according to the method for producing a modified sulfide solid electrolyte according to the ninth aspect of the present embodiment, the heteropolycyclic compound can be present so as to adhere to the surface of the sulfide solid electrolyte from the viewpoint of its characteristics, and therefore, the modified sulfide solid electrolyte has excellent coating suitability and efficiently exhibits excellent battery performance, and such a modified sulfide solid electrolyte of the present embodiment can be produced more efficiently.

Although a mixture in the form of a solution or a slurry is obtained by mixing the sulfide solid electrolyte, the heteropolycyclic compound, and the organic solvent, since the modified sulfide solid electrolyte cannot be used as it is, the method includes removing the organic solvent from the solution or the slurry.

In the method for producing the modified sulfide solid electrolyte according to a thirteenth aspect of the present embodiment, the organic solvent used in the production method according to the twelfth aspect is at least one solvent selected from an aliphatic hydrocarbon solvent, an alicyclic hydrocarbon solvent, an aromatic hydrocarbon solvent, an ether solvent, an ester solvent, and a nitrile solvent.

By using the solvent as the organic solvent, the adhesion of the heteropolycyclic compound to the surface of the sulfide solid electrolyte can be promoted, and the coating suitability can be easily improved.

An electrode combined material according to a fourteenth aspect of the present embodiment is an electrode combined material including the modified sulfide solid electrolyte according to any one of the first to eleventh aspects and an electrode active material.

In addition, a lithium-ion battery according to a fifteenth aspect of the present embodiment is a lithium-ion battery including at least one of the modified sulfide solid electrolyte according to any one of the first to eleventh aspects and the electrode combined material according to the fourteenth aspect.

As described above, the modified sulfide solid electrolyte of the present embodiment is excellent in coating suitability when coated as a paste, and can efficiently exhibit excellent battery performance. Therefore, since the electrode combined material containing the modified sulfide solid electrolyte of the present embodiment is also excellent in coating suitability, a lithium-ion battery can be efficiently produced, and the obtained lithium-ion battery has excellent battery performance.

(Modified Sulfide Solid Electrolyte)

The modified sulfide solid electrolyte of the present embodiment is a modified sulfide solid electrolyte containing: a sulfide solid electrolyte having a BET specific surface area of 10 $m^2/g$ or more and containing a lithium atom, a sulfur atom, a phosphorus atom, and a halogen atom; and a compound having two or more heterocyclic rings each having a carbon atom and an oxygen atom.

Hereinafter, a compound having two or more heterocyclic rings each having a carbon atom and an oxygen atom (heteropolycyclic compound), which is contained in the modified sulfide solid electrolyte of the present embodiment, will be described.

(Heteropolycyclic Compound)

The modified sulfide solid electrolyte of the present embodiment contains a compound having two or more heterocyclic rings each having a carbon atom and an oxygen atom (heteropolycyclic compound). As the heteropolycyclic compound, any heterocyclic compound having two or more heterocyclic rings each having a carbon atom and an oxygen atom can be used without particular limitation, and an effect of excellent coating suitability when coated as a paste and efficiently exhibiting excellent battery performance can be obtained.

As the heterocyclic ring having a carbon atom and an oxygen atom, a heterocyclic ring constituted of two or more carbon atoms and one or more oxygen atoms can be used without particular limitation. The number of atoms constituting the heterocyclic ring is preferably 3 or more, and the upper limit thereof is not particularly limited, and is preferably 24 or less, more preferably 20 or less, still more preferably 16 or less, and even more preferably 12 or less. In a case where the number of atoms constituting the heterocyclic ring is within the above-described range, the oil absorption is reduced, excellent coating suitability is easily obtained, and excellent battery performance is more efficiently obtained.

For example, a heterocyclic ring in which the number of atoms constituting the heterocyclic ring is three is also referred to as a three membered ring, and examples thereof include saturated heterocyclic rings such as an oxirane ring and a dioxirane ring. In addition, since an oxaziridine ring containing an oxygen atom and a nitrogen atom also contains an oxygen atom, a compound having an oxaziridine ring can also be used as the heterocyclic ring.

A compound having an oxirane ring as a heterocyclic ring, in particular, a compound having two or more oxirane rings (hereinafter, also referred to as "polyfunctional epoxy compound") is a particularly preferable compound among the heteropolycyclic compounds used in the modified sulfide solid electrolyte of the present embodiment. The polyfunctional epoxy compound will be described in detail later.

As the heterocyclic ring constituted by four or more atoms, representatively, preferable examples include a four membered ring such as a saturated heterocyclic ring such as an oxetane ring and a dioxetane ring, and an unsaturated heterocyclic ring such as an oxetene ring: a five membered ring such as a saturated heterocyclic ring such as a tetrahydrofuran ring, a dioxolane ring, a oxazolidine ring, and an oxathiolane ring, and an unsaturated heterocyclic ring such as a furan ring, an oxazole ring, and an oxadiazole ring; and a six membered ring such as a saturated heterocyclic ring such as a tetrahydropyran ring, a dioxane ring, and a morpholine ring, and an unsaturated heterocyclic ring such as a pyran ring, a dioxin ring, and an oxazine ring.

In addition, the heterocyclic ring having a carbon atom and an oxygen atom is not limited to a monocyclic heterocyclic ring as described above as long as the heterocyclic ring has a heterocyclic ring containing an oxygen atom, and may be a polycyclic heterocyclic ring in which two or more alicyclic rings are condensed, for example, representatively, a heterocyclic ring such as an epoxycyclohexane ring in which cyclohexane and oxirane are condensed, an oxaspirodecane ring in which cyclohexane and tetrahydrofuran are condensed, or a benzofuran ring in which benzene and furan are condensed.

In view of reduced oil absorption, easy attainment of excellent coating suitability, more efficient attainment of excellent battery performance, easy availability, and cost, among the compounds having a heterocyclic ring, a compound having two or more monocyclic heterocyclic rings is preferred, the heterocyclic ring is preferably a saturated heterocyclic ring, and the number of atoms constituting the heterocyclic ring is preferably 3 or more, and the upper limit thereof is preferably 12 or less, more preferably 8 or less, still more preferably 6 or less, and even more preferably 5 or less.

(Polyfunctional Epoxy Compound)

As one of preferable compounds among the heteropolycyclic compounds used in the present embodiment, a compound having two or more oxirane rings as heterocyclic rings (poly functional epoxy compound) will be described.

The group having an oxirane ring contained in the polyfunctional epoxy compound is preferably contained as an epoxy group, or as a glycidyl group containing an epoxy group, or a glycidyl ether group. That is, as the polyfunctional epoxy compound, an epoxy compound having at least two or more groups selected from an epoxy group, a glycidyl group, and a glycidyl ether group is preferable. This is because the oil absorption is reduced, excellent coating suitability is easily obtained, and excellent battery performance is more efficiently obtained.

Preferred examples of such a polyfunctional epoxy compound include an epoxy compound having at least two or more groups selected from an epoxy group, a glycidyl group, and a glycidyl ether group, represented by the following general formula (1).

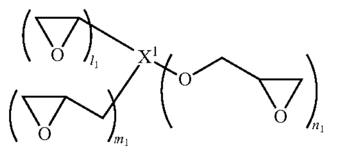

(1)

In the general formula (1). $X^1$ is a single bond or an aliphatic group, an alicyclic group, an aromatic group, an organic group having a siloxane structure, or an organic group composed of a combination thereof; $l_1$, $m_1$, and $n_1$ are each an integer of 0 or more and 16 or less, and satisfy $l_1+m_1+n_1 \geq 2$; and when the organic group of $X^1$ has the alicyclic group, the epoxy group may be condensed with an alicyclic ring in the alicyclic group.

(Single Bond)

When $X^1$ is a single bond, preferred examples of the polyfunctional epoxy compound include butadiene diepoxide to which two epoxy groups are bonded, and hexadiene diepoxide to which two glycidyl groups are bonded. In addition, the hexadiene diepoxide to which two glycidyl groups are bonded may be understood as an epoxy compound in which $X^1$ is a single bond, $m_1$ is 2, and $l_1$ and $n_1$ are 0 in the general formula (1), or may be understood as an epoxy compound in which $X^1$ is an ethylene group, $l_1$ is 2, and $m_1$ and $n_1$ are 0 in the general formula (1) on the assumption that two epoxy groups are bonded to both ends of an ethylene group.

In addition, when $X^1$ is a single bond, preferred examples of the polyfunctional epoxy compound also include diglycidyl ether in which a glycidyl group and a glycidyl ether group are bonded to each other. The diglycidyl ether is an epoxy compound in which $X^1$ is a single bond, $m_1$ is 1, and $n_1$ is 1 in the general formula (1).

(Aliphatic Group)

With respect to $X^1$ in the general formula (1), preferred examples of the aliphatic group include a group having, as a bonding site, a moiety obtained by removing hydrogen atoms corresponding to the number of groups ($l_1+m_1+n_1$) of at least two groups selected from an epoxy group, a glycidyl group, and a glycidyl ether group from alkane, alkene, and alkyne. For example, a group having a moiety obtained by removing two hydrogen atoms from alkane (divalent aliphatic group) as a bonding site is an alkanediyl group (alkylene group), and a group having a moiety obtained by removing three hydrogen atoms from alkane (trivalent aliphatic group) as a bonding site is an alkanetriyl group.

As described above, in the present embodiment, the name of the group can be changed according to the number of bonding sites of $X^1$ (that is, the number of groups ($l_1+m_1+n_1$) of at least two or more groups selected from an epoxy group, a glycidyl group, and a glycidyl ether group bonded to $X^1$). Therefore, in the description herein, a basic structure (for example, corresponding to the above-described alkane, alkene, and alkyne) which is a base of the aliphatic group and other groups will be described below.

As the basic structure of the aliphatic group, as described above, alkane, alkene, and alkyne are preferably exemplified. This is because the oil absorption is reduced, excellent coating suitability is easily obtained, and excellent battery performance is more efficiently obtained. In addition, in consideration of availability, alkanes and alkenes are more preferable, and alkanes are still more preferable.

The number of carbon atoms in these aliphatic groups is preferably 1 or more, more preferably 2 or more, and the upper limit thereof is 24 or less, preferably 16 or less, more preferably 10 or less, still more preferably 8 or less, and even more preferably 6 or less. When the number of carbon atoms of the aliphatic group is within the above range, the oil absorption is reduced, excellent coating suitability is easily obtained, and excellent battery performance is more efficiently obtained.

As the polyfunctional epoxy compound having an aliphatic group as $X^1$ in the general formula (1), for example, ethylene glycol diglycidyl ether in which the aliphatic group is an ethylene group and which has two glycidyl ether groups ($m_1$ is 2), butanediol diglycidyl ether in which the aliphatic group is a butylene group and which has two glycidyl ether groups (n) is 2), hexanediol diglycidyl ether in which the aliphatic group is a hexylene group and which has two glycidyl ether groups ($n_1$ is 2), and octadiene diepoxide in which the aliphatic group is an ethylene group and which has two glycidyl groups ($m_1$ is 2) are representatively and preferably exemplified.

In the description herein, for example, when expressed as the above-described “butanediol diglycidyl ether”, both linear and branched butane is included as butane (alkane having 4 carbon atoms), and the position of the carbon atom to which the diglycidyl ether group is linked (position of diol) includes all possible positions.

More specifically, the “butanediol diglycidyl ether” includes 1,4-butanediol diglycidyl ether (which is a polyfunctional epoxy compound used in Examples) in which one glycidyl ether is linked to each of the carbons at the 1- and 4-positions of butanediol, and also includes one in which glycidyl ether groups linked to other carbons, for example, 1,2-butanediol diglycidyl ether in which one glycidyl ether is linked to each of the carbons at the 1- and 2-positions of butanediol, and 1,3-butanediol diglycidyl ether in which one glycidyl ether is linked to each of the carbons at the 1- and 3-positions of butanediol. In addition. 2-methyl-1,3-propanediol diglycidyl ether in which butane of 1,3-butanediol becomes branched 2-methylpropane and one glycidyl ether is linked to each of the carbons at the 1- and 3-positions of 2-methyl-1,3-propanediol is also included.

These aliphatic groups may be linear or branched.

In addition, at least a part of hydrogen atoms may be substituted with a halogen atom, a hydroxy group, or an amino group. In this case, the halogen atom is preferably a fluorine atom.

Typical preferred examples of the polyfunctional epoxy compound having a branched aliphatic group as $X^1$ in the general formula (1) include neopentyl glycol diglycidyl ether in which the aliphatic group is a neopentylene group and which has two glycidyl ether groups ($n_1$ is 2); trimethylolpropane triglycidyl ether in which the aliphatic group is a group obtained by removing three hydrogens from 2,2-dimethylbutane which is a branched alkane, which is the basic structure and which has three glycidyl ether groups ($n_1$ is 3); and pentaerythritol trimethylolpropane triglycidyl ether in which the aliphatic group is a group obtained by removing four hydrogens from pentaerythritol which is the basic structure and which has four glycidyl ether groups ($m_1$ is 4) (or it can be said that it is a compound in which the aliphatic group is a group obtained by removing four hydrogens from 2,2-dimethylbutane which is the basic structure and which has four glycidyl ether groups ($n_1$ is 4)).

In addition, typical preferred examples of the polyfunctional epoxy compound having an aliphatic group in which at least a part of hydrogen atoms is substituted as $X^1$ in the general formula (1) include 2,2'-(2,2,3,3,4,4,5,5-octafluorohexane-1,6-diyl)bisoxirane in which the aliphatic group is a group (2,2,3,3,4,4,5,5-octafluorohexane-1,6-diyl group) obtained by removing two hydrogens from 2,2,3,3,4,4,5,5-octafluorohexane in which eight hydrogen atoms of hexane which is the basic structure are substituted with a fluorine atom, and which has two epoxy groups ($l_1$ is 2).

The above-mentioned 2,2'-(2,2,3,3,4,4,5,5-octafluorohexane-1,6-diyl)bisoxirane is a compound used in Examples, and therefore the positions substituted with a fluorine atom and the like are specified. However, in the description herein, a compound whose position is specified means itself when described in Examples, but in cases other than the case described in Examples, as in the case where the compound is described without specifying the position, hexane (alkane having 6 carbon atoms) is included in either a linear or branched form, and the position of the carbon atom substituted with fluorine and the position of the carbon atom to which the oxirane ring (epoxy group) is linked include all possible positions.

(Alicyclic Group)

As the basic structure of the alicyclic group of $X^1$ in the general formula (1), cycloalkanes and cycloalkenes are preferably exemplified. This is because the oil absorption is reduced, excellent coating suitability is easily obtained, and excellent battery performance is more efficiently obtained. In addition, in consideration of availability, cycloalkanes are more preferable.

In the present embodiment, as the basic structure of the alicyclic group, a structure including a plurality of alicyclic rings is also exemplified, and for example, a bonded polyalicyclic structure such as bicyclohexyl: a structure in which two or more alicyclic rings are condensed, such as hexahydronaphthalene, octahydronaphthalene, and decahydronaphthalene; and a bridged cyclic structure such as norbomane, norbomene, adamantane, tricyclodecane, and pinene are also preferably exemplified. In addition to these, examples of the basic structure having a double bond in an alicyclic ring include basic structures such as pentalene and azulene.

Furthermore, a structure in which any of the above-described basic structure of a single alicyclic ring, the basic structure of a plurality of alicyclic rings, and the basic structure of an aromatic ring described below is bonded or condensed is also preferably exemplified as the basic structure.

As the polyfunctional epoxy compound having an alicyclic group as $X^1$ in the general formula (1), cyclohexanedimethanol diglycidyl ether (in Examples, 1,4-cyclohexanedimethanol diglycidyl ether was used) in which the alicyclic group is a dimethylcyclohexylene group and which has two glycidyl ether groups ($n_1$ is 2) is representatively and preferably exemplified.

In the present embodiment, the basic structure of the alicyclic group may be one having a heterocyclic ring in which a carbon atom is substituted with a hetero atom such as a nitrogen atom, an oxygen atom, a sulfur atom, or a phosphorus atom in the above-exemplified basic structures.

In the above-exemplified basic structures, at least a part of hydrogen atoms may be substituted with a halogen atom such as a fluorine atom, a hydroxy group, an amino group, or the above-described aliphatic group. In this case, the aliphatic group is preferably an alkyl group or an alkenyl group, the number of carbon atoms is preferably 1 or more, and the upper limit thereof is preferably 12 or less, more preferably 8 or less, still more preferably 6 or less, and even more preferably 4 or less.

When $X^1$ is an alicyclic group, the epoxy group (oxirane ring) may be present by being condensed with an alicyclic ring in the alicyclic group.

As a basic structure of the alicyclic group which can be condensed with such an epoxy group (oxirane ring), cyclopentane, cyclohexane, and cyclooctane are representatively and preferably exemplified, and cyclohexane is preferable from the viewpoint of easy availability. For example, in a case where the basic structure of the alicyclic group is cyclohexane, when condensed with an epoxy group, epoxycyclohexane is formed. Therefore, as the polyfunctional epoxy compound, a compound having epoxycyclohexane in a part thereof is obtained. As such a polyfunctional epoxy compound, for example, 1,3-bis[2-(7-oxabicyclo[4.1.0]heptan-3-yl)ethyl]-1,1,3,3-tetramethyldisiloxane used in Examples (in the general formula (1), the basic structure of $X^1$ is 1,3-ethylcyclohexyl-1,1,3,3-tetramethyldisiloxane (a compound in which a hydrogen atom connected to a silicon atom in tetramethyldisiloxane is substituted with a propyl group), hi is 2, and an epoxy group is condensed with cyclohexane to be present as epoxycyclohexane) is representatively and preferably exemplified.

The polyfunctional epoxy compound containing an alicyclic ring condensed with an epoxy group may be, for example, a compound in which an alicyclic ring condensed with an epoxy group such as epoxycyclohexane is bonded to another group such as an aliphatic group, an alicyclic group or an aromatic group through or not through a bonding site described later, and an epoxy group, a glycidyl group, or a glycidyl ether group is bonded to the other group. In this case, the epoxy group bonded to the other group may be condensed with an alicyclic ring.

In addition, for example, in the basic structure having a bridged cyclic structure, an epoxy compound in which two or more epoxy groups and alicyclic rings are condensed, for example, a bifunctional epoxy compound such as 4,5:8,9-diepoxytricyclo[5.2.1.02,6]decane may be used.

The number of carbon atoms in the alicyclic group is 3 or more, preferably 4 or more, more preferably 6 or more, and the upper limit thereof is preferably 24 or less, more preferably 20 or less, still more preferably 16 or less, and even more preferably 12 or less.

(Aromatic Group)

With respect to $X^1$ in the general formula (1), preferred examples of the basic structure of the aromatic group include monocyclic aromatic compounds such as benzene, toluene, and styrene; bonded polycyclic aromatic compounds in which a plurality of aromatic rings are bonded, such as biphenyl, diphenylmethane (benzylbenzene), diphenylethane (bibenzyl), methylidynetrisphenol, and triphenylcyclohexane; condensed polycyclic aromatic compounds in which a plurality of aromatic rings are condensed, such as naphthalene, phenanthrene, anthracene, pyrene, triphenylene, tetracene, and pentacene; and condensed polycyclic aromatic compounds in which an aromatic ring and an alicyclic ring are condensed, such as indene, indacene, acenaphthene, dihydronaphthalene, tetrahydronaphthalene, biphenylene, fluorene, and fluoranthene.

Further, a structure in which any of these aromatic ring basic structures, the above-described single alicyclic ring basic structure, and a plurality of alicyclic ring basic structures is bonded or condensed, for example, a compound in which two benzenes are singly bonded to the 9-position of fluorene, such as diphenylfluorene (9,9-diphenyl-9H-fluorene) is also preferably exemplified as the basic structure.

As the polyfunctional epoxy compound having an aromatic group as $X^1$ in the general formula (1), diglycidyl resorcinol ether (which is a compound having a 1,3-phenylene group) and 1,4-diglycidyl oxybenzene (which is a compound having a 1,4-phenylene group), in which the aromatic group is a phenylene group and each of which has two glycidyl ether groups ($m_1$ is 2), and tris(4-hydroxyphenyl) methane triglycidyl ether, in which the aromatic group is a group obtained by removing three hydrogens from methylidine trisphenol, which is a bonded polycyclic aromatic compound as the basic structure, and which has three glycidyl groups ($m_1$ is 3), are representatively and preferably exemplified.

In addition, 9,9-bis(4-glycidyloxyphenyl) fluorene in which the aromatic group is a group obtained by removing two hydrogen atoms from 9,9-bis(4-hydroxy phenyl) fluorene, which is a condensed polycyclic aromatic compound as the basic structure, and which has two glycidyl groups (m) is 2) is also representatively and preferably exemplified.

Preferred examples of the basic structure of the aromatic group also include a bisphenol compound. Preferred examples of the main bisphenol compound include bisphenol compounds such as bisphenol A (2,2-bis(4-hydroxyphenyl) propane), bisphenol AP (1,1-bis(4-hydroxyphenyl)-1-phenyl ethane), bisphenol B (2,2-bis(4-hydroxyphenyl) butane), bisphenol BP (bis(4-hydroxyphenyl)diphenylmethane), bisphenol M (1,3-bis(2-(4-hydroxyphenyl)-2-propyl) benzene), bisphenol PH (5,5'-(1-methylethylidene)-bis[1,1'-(biphenyl)-2-ol]propane), and bisphenol Z (1,1-bis(4-hydroxyphenyl)cyclohexane), and compounds containing these bisphenol compounds.

In addition to the above compounds, bisphenol compounds such as bisphenol AF (2,2-bis(4-hydroxyphenyl) hexafluoropropane) in which a part of the compound is substituted with a halogen atom such as a fluorine atom, and bisphenol S (bis(4-hydroxyphenyl) sulfone) containing an oxygen atom and a sulfur atom in the molecule are also preferably exemplified.

As the poly functional epoxy compound having an aromatic group as $X^1$ in the general formula (1), in which the basic structure of the aromatic group is a bisphenol compound, bisphenol A diglycidyl ether in which the aromatic group is a group obtained by removing a hydrogen atom from a hydroxy group of bisphenol A which is the basic structure and which has two glycidyl groups ($m_1$ is 2), and bisphenol A propoxylate diglycidyl ether in which the aromatic group is a group obtained by removing a hydrogen atom from a propyl group of 2,2-bis((4-propoxyphenyl) propane) in which a hydrogen atom of a hydroxy group of bisphenol A which is the basic structure is substituted with a propyl group and which has two glycidyl ether groups ($n_1$ is 2) are representatively and preferably exemplified.

In the present embodiment, the basic structure of the aromatic group may be one having a heterocyclic ring in which a carbon atom is substituted with a hetero atom such as a nitrogen atom, an oxygen atom, a sulfur atom, or a phosphorus atom in the above-exemplified basic structures.

In the above-exemplified basic structures, at least a part of hydrogen atoms may be substituted with a halogen atom such as a fluorine atom, a hydroxy group, an amino group, or the above-described aliphatic group. In this case, the aliphatic group is preferably an alkyl group or an alkenyl group, the number of carbon atoms is preferably 1 or more, and the upper limit thereof is preferably 12 or less, more preferably 8 or less, still more preferably 6 or less, and even more preferably 4 or less.

In the basic structure of the aromatic group, among these substituents, an amino group and a hydroxy group are preferred. When the aromatic group is substituted with an amino group, aniline and dimethylaniline are preferably exemplified, and when the aromatic group is substituted with a hydroxy group, phenol and benzenediol are preferably exemplified. Further, hydroxyaniline (aminophenol) or the like substituted with an amino group and a hydroxy group is also preferred.

As the polyfunctional epoxy compound having an aromatic group as $X^1$ in the general formula (1), in which the basic structure of the aromatic group is substituted with an amino group or a hydroxy group, N,N-diglycidyl-4-glycidyloxyaniline in which the aromatic group is a group obtained by removing a hydrogen atom from an amino group and a hydroxy group of hydroxyaniline (which is a compound in which two hydrogen atoms of benzene are substituted with an amino group and a hydroxy group) which is the basic structure, and which has two glycidyl groups ($m_1$ is 3); and 4,4'-methylenebis(N,N-diglycidylaniline) in which the aromatic group is a group obtained by removing a hydrogen atom from an amino group of 4,4'-methylenebis(N,N-dimethylaniline) (which is a compound in which each of two hydrogen atoms of diphenylmethane is substituted with an amino group) which is the basic structure, and which has four glycidyl groups ($m_1$ is 4) are representatively and preferably exemplified.

In addition, each of diglycidyl resorcinol ether and 1,4-diglycidyl oxybenzene mentioned as specific examples above can be regarded as a compound in which the aromatic group is a group obtained by removing a hydrogen atom from a hydroxy group of a compound (benzenediol) in which two hydrogen atoms of benzene, which is the basic structure, are substituted with a hydroxy group, and which has two glycidyl groups ($m_1$ is 2), and therefore, it can also be considered that in the polyfunctional epoxy compound having an aromatic group as $X^1$ in the general formula (1), the basic structure of the aromatic group is substituted with an amino group, a hydroxy group, or the like.

The number of carbon atoms in the aromatic group is 6 or more, preferably 4 or more, more preferably 6 or more, and the upper limit thereof is preferably 36 or less, more preferably 32 or less, and still more preferably 28 or less.

(Organic Group Having Siloxane Structure)

With respect to $X^1$ in the general formula (1), the basic structure of the organic group having a siloxane structure is not particularly limited as long as it has at least a —Si—O— bond, and preferred examples thereof include chain siloxane compounds such as alkoxysilanes having one silicon atom, such as dimethylmethoxysilane, dimethoxymethylsilane, trimethoxysilane, trimethoxymethylsilane, and tetramethoxysilane; and disiloxane compounds having two silicon atoms, such as tetramethyldisiloxane, hexamethyldisiloxane, and divinyltetramethyldisiloxane.

In addition, cyclic siloxane compounds such as hexamethylcyclotrisiloxane, octamethylcyclotetrasiloxane, and decamethylcyclopentasiloxane, and cage-type siloxane compounds such as silsesquioxane are also preferably exemplified.

Regarding the chain siloxane compound and the cyclic siloxane compound, compounds in which the alkyl group in the group bonded to a silicon atom and the alkoxy group is a methyl group are exemplified, but it goes without saying that compounds in which groups other than a methyl group, that is, the above-described aliphatic group, alicyclic group, or aromatic group such as an ethyl group and a propyl group are bonded can also be included. In this case, the aliphatic group is preferably an alkyl group or an alkenyl group, the number of carbon atoms is preferably 1 or more, and the upper limit thereof is preferably 12 or less, more preferably 8 or less, still more preferably 6 or less, and even more preferably 4 or less.

Regarding the above-described chain siloxane compound, as a compound containing a group other than a methyl group, for example, polyfunctional epoxy compounds having a siloxane compound as the basic structure, such as 1,3-dipropyl-1,1,3,3-tetramethyldisiloxane in which one methyl group bonded to two silicon atoms in hexamethyldisiloxane is each a propyl group, and 1,3-dicyclohexane-ethyl-1,1,3,3-tetramethyldipropyldisiloxane in which one methyl group bonded to two silicon atoms in hexamethyldisiloxane is each cyclohexaneethyl, are easily available, and therefore, these compounds are preferably exemplified as a chain siloxane compound which is the basic structure.

As the polyfunctional epoxy compound having an organic group having a siloxane structure as $X^1$ in the general formula (1), 1,3-bis(3-glycidyloxypropyl)tetramethyldisiloxane in which the organic group having a siloxane structure is a group obtained by removing two hydrogen atoms from propyl groups of 1,3-dipropyl-1,1,3,3-tetramethyldisiloxane which is the basic structure and which has two glycidyl ether groups ($n_1$ is 3) is representatively and preferably exemplified.

In addition, 1,3-bis[2-(7-oxabicyclo[4.1.0]heptan-3-yl)ethyl]-1,1,3,3-tetramethyldisiloxane described as the compound having epoxycyclohexane in which an alicyclic group and an epoxy group are condensed is also representatively and preferably exemplified as the polyfunctional epoxy compound having an organic group having a siloxane structure as $X^1$ in the general formula (1).

In addition, regarding the cyclic siloxane compound, for example, in octamethylcyclotetrasiloxane, a polyfunctional epoxy compound having a basic structure of 2,4,6,8-tetramethyl-2,4,6,8-tetrapropylcyclotetrasiloxane, in which one methyl group of methyl groups bonded to four silicon atoms is each a propyl group is easily available, and therefore, the polyfunctional epoxy compound is preferably exemplified as a cyclic siloxane compound which is the basic structure.

As the polyfunctional epoxy compound having an organic group having a siloxane structure in which the basic structure is a cyclic siloxane compound as $X^1$ in the general formula (1), 1,3-bis(3-glycidyloxypropyl)tetramethyldisiloxane in which the organic group having a siloxane structure is a group obtained by removing four hydrogen atoms from propyl groups of 2,4,6,8-tetramethyl-2,4,6,8-tetrapropylcyclotetrasiloxane which is the basic structure and which has four glycidyl ether groups (1 is 4) is representatively and preferably exemplified.

In addition, for example, as the polyfunctional epoxy compound having an organic group having a siloxane structure in which the basic structure is a cage-type siloxane compound as $X^1$ in the general formula (1), PSS-octa[(3-glycidyloxypropyl)dimethylsiloxy] substituted in which the organic group having a siloxane structure is a group obtained by removing one hydrogen atom from each of eight propyl groups in a compound (which can also be referred to as "PSS-octa[propyldimethylsiloxy] substituted") in which one propyldimethylsiloxy group (a total of eight) is bonded to each of eight silicon atoms of silsesquioxane (PSS-octamethyl substituted) as the basic structure, and which has eight glycidyl ether groups ($n_1$ is 8) is representatively and preferably exemplified.

The number of silicon atoms in the basic structure having a siloxane structure is preferably 1 or more, and more preferably 2 or more, and the upper limit thereof is preferably 12 or less, more preferably 8 or less, still more preferably 6 or less, and even more preferably 4 or less.

(Bonding Group)

In the present embodiment, the group composed of a combination thereof, which is $X^1$, may be a group formed by bonding at least two groups selected from the aliphatic group, the alicyclic group, the aromatic group, and the organic group having a siloxane structure by a single bond or a bonding group selected from —O—, —$SO_2$—, —CO—, —C(═O)O—, —N—, and —S—. In the description herein, the aliphatic group, the alicyclic group, the aromatic group, and the organic group having a siloxane structure in $X^1$ are described by being replaced with a basic structure including these groups. Therefore, it can be considered that the basic structure is bonded by a single bond or a bonding group such as —O—.

As a case where $X^1$ is a group formed by bonding at least two groups selected from an aliphatic group, an alicyclic group, an aromatic group, and an organic group having a siloxane structure by a single bond, a case where one group is substituted with another group as described above, a case where two benzenes as other basic structures are single-bonded to the 9-position of fluorene as one basic structure such as the above-described diphenylfluorene (9,9-diphenyl-9H-fluorene) are preferably exemplified.

In addition, in a case where $X^1$ is a group formed by bonding by a single bond, basic structures such as 4,4-methylenedianiline (p-toluidine) in which aniline and 4-methylaniline are single-bonded and 4,4'-methylenebis(N,N-dimethylaniline) in which dimethylaniline and 4,N,N-trimethylaniline are single-bonded, which are basic structures including aniline, are also preferably exemplified.

As a case where $X^1$ has —O— as a bonding group, for example, a case where a plurality of aliphatic groups are bonded by —O—, more specifically, a basic structure having a repeating unit represented by —$R^1$O—($R^1$ is a divalent aliphatic group, preferably an alkylene group) such as oxyethylene or oxypropylene is representatively and preferably exemplified.

When the basic structure has —$R^1$O—, the number of —$R^1$O— may be one, or may be two or more. When the number is two or more, the average number of repetitions (n)

is preferably 2 or more, more preferably 4 or more, and still more preferably 5 or more, and the upper limit thereof is preferably 200 or less, more preferably 180 or less, and still more preferably 170 or less.

The number average molecular weight of the poly functional epoxy compound in this case cannot be determined unconditionally because it may vary depending on what is used as $R^1$ in —$R^1$O—, but is preferably 200 or more, more preferably 300 or more, and still more preferably 350 or more, and the upper limit thereof is preferably 10,000 or less, more preferably 8.000 or less, still more preferably 7,000 or less, and even more preferably 6.500 or less.

As the polyfunctional epoxy compound in a case where $X^1$ has —O— as a bonding group, polypropylene glycol diglycidyl ether in which —$R^1$O— is an oxypropylene group ($R^1$ is a propylene group) and which has one glycidyl group and a glycidyl ether group ($m_1$ is 1 and $n_1$ is 1), and polyethylene glycol diglycidyl ether in which —R'O— is an oxyethylene group ($R^1$ is an ethylene group) and which has one glycidyl group and a glycidyl ether group ($m_1$ is 1 and $n_1$ is 1) are representatively and preferably exemplified. In addition, the average number of repetitions (n) in these polyethylene glycol diglycidyl ether and polypropylene glycol diglycidyl ether is appropriately selected from the above range.

As the basic structure in the case where $X^1$ has —O— as a bonding group, a compound in which aliphatic groups are bonded via —O—, such as diethylene glycol or diglycerin, is also preferably exemplified.

In addition, as the basic structure in the case where $X^1$ has —O— as a bonding group, a compound in which an alicyclic ring is bonded via —O—, such as dicyclohexyl ether; and a compound in which an aromatic ring is bonded via —O—, such as dihydroxydiphenyl ether and phenylbiphenyl ether, are preferably exemplified.

As the polyfunctional epoxy compound in the case where $X^1$ has —O— as a bonding group, diethylene glycol diglycidyl ether in which a group of $X^1$ having-O— as a bonding group is —$CH_2CH_2$—O—$CH_2CH_2$-in which two ethylene groups are bonded by —O— (a group in which the basic structure is diethylene glycol, and two hydrogen atoms are removed), and which has two glycidyl ether groups (n) is 2) is representatively and preferably exemplified.

In a case where $X^1$ has-C(═O)O— as a bonding group, for example, a compound in which two alicyclic rings are bonded via —C(═O)O—, such as cyclohexylmethyl cyclohexanecarboxylate is preferably exemplified.

($l_1$, $m_1$, and $n_1$)

$l_1$, $m_1$, and $n_1$ are each an integer of 0 or more and 16 or less, and satisfy $l_1+m_1+n_1 \geq 2$.

$l_1$, $m_1$, and $n_1$ are not particularly limited as long as the total ($l_1+m_1+n_1$) thereof is 2 or more, and in the case of 1 or more, it is preferably 2 or more, and the upper limit thereof is preferably 10 or less, more preferably 8 or less, and still more preferably 4 or less.

In addition, $l_1+m_1+n_1$ is not particularly limited as long as it is 2 or more, and preferably 2 or more, and the upper limit thereof is preferably 10 or less, more preferably 8 or less, and still more preferably 4 or less.

When $l_1$, $m_1$, and $n_1$ satisfy the above ranges, the oil absorption is reduced, excellent coating suitability is easily obtained, and excellent battery performance is more efficiently obtained. In addition, in consideration of easy availability, it is preferable that any one of $l_1$, $m_1$, and $n_1$ is 2 or more and the other two are 0. That is, it is preferable that the polyfunctional epoxy compound used in the present embodiment has two or more groups of any one of an epoxy group, a glycidyl group, and a glycidyl ether group from the viewpoint of easy availability.

In addition, in consideration of easy availability, a polyfunctional epoxy group in which any one of $l_1$, $m_1$, and $n_1$ is 1 and any one of the other two is 1 or more is also preferable. In this case, from the same viewpoint, a poly functional epoxy compound having one glycidyl ether group and one or more glycidyl groups is preferable, and a polyfunctional epoxy compound having one glycidyl ether group and two glycidyl groups is more preferable.

(Other Heteropolycyclic Compounds)

Examples of the heteropolycyclic compound used in the present embodiment other than the above-described polyfunctional epoxy compound include a compound having a heterocyclic ring other than an oxirane ring among heterocyclic rings constituted by three atoms, and a compound having a heterocyclic ring constituted by four or more atoms. Preferred examples of such a heterocyclic polycyclic compound other than the polyfunctional epoxy compound include a compound represented by the following general formula (2).

(2)

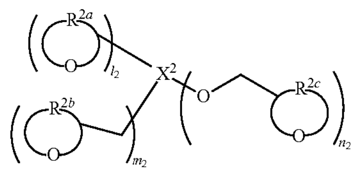

In the general formula (2). $X^2$ is a single bond or an aliphatic group, an alicyclic group, an aromatic group, an organic group having a siloxane structure, or an organic group composed of a combination thereof, and $R^{2a}$, $R^{2b}$ and $R^{2c}$ are each independently an aliphatic group having 1 or more carbon atoms. The heterocyclic ring including $R^{2a}$, $R^{2b}$, and $R^{2c}$ may contain a bonding group selected from —O—, —$SO_2$—, —CO—, —C(═O)O—, —N—, and —S—.

$l_2$, $m_2$, and $n_2$ are each an integer of 0 or more and 16 or less, and satisfy $l_2+m_2+n_2 \geq 2$. In addition, when the organic group of $X^2$ has the alicyclic group, the heterocyclic group may be condensed with an alicyclic ring in the alicyclic group.

In the general formula (2), the single bond or the aliphatic group, the alicyclic group, the aromatic group, the organic group having a siloxane structure, or the organic group composed of a combination thereof of $X^2$ is the same as that described as the single bond or the aliphatic group, the alicyclic group, the aromatic group, the organic group having a siloxane structure, or the organic group composed of a combination thereof of $X^1$ in the general formula (1).

Further, $l_2$, $m_2$, and $n_2$ are the same as those described as $l_1$, $m_1$, and $n_1$ of the general formula (1), respectively.

In the general formula (2), the aliphatic groups of $R^{2a}$, $R^{2b}$, and $R^{2c}$ each form an alicyclic structure together with an oxygen atom. Examples of the aliphatic group of $R^{2a}$, $R^{2b}$, and $R^{2c}$ include divalent aliphatic groups such as an alkylene group, an alkenylene group, and an alkynylene group. In the present embodiment, any of these groups may be used, and in consideration of easy availability, an alkylene group and an alkenylene group are preferred, and an alkylene group is more preferred.

From the same viewpoint, the number of carbon atoms of the aliphatic group of $R^{2a}$, $R^{2b}$, and $R^{2c}$ is preferably 2 or more, and more preferably 3 or more, and the upper limit thereof is preferably 12 or less, more preferably 8 or less, and still more preferably 6 or less.

The compound represented by the general formula (2) is a heteropolycyclic compound other than the above-described polyfunctional epoxy compound. Therefore, for example, when $R^{2a}$, $R^{2b}$, and $R^2$ are each an aliphatic group having 2 carbon atoms and $l_{22}$, $m_{22}$, and $n_{22}$ are each 1, the aliphatic group having 2 carbon atoms is a group other than an alkylene group, that is, an alkenylene group or an alkynylene group. Even when $R^{2a}$, $R^{2b}$, and $R^{2c}$ are each an aliphatic group having 2 carbon atoms and $l_{22}$, $m_{22}$, and $n_{22}$ are each 1, the aliphatic group having 2 carbon atoms may be an alkylene group (i.e., an ethylene group) when the heterocyclic ring includes a bonding group described later. For example, in the case where the aliphatic group having 2 carbon atoms may be an alkylene group (i.e., an ethylene group), examples of the case include an oxathietane ring having $R^{2a}$, $R^{2b}$, and $R^{2c}$ each being an ethylene group and having —S— as a bonding group.

As the heteropolycyclic compound in the case where $R^{2a}$ of the heterocyclic ring is an alkylene group, a compound in which $X^2$ is a group obtained by removing two hydrogen atoms from butanediol which is the basic structure, and which has two tetrahydrofuran rings ($R^{2a}$ is a butylene group) (12 is 2) such as bis(tetrahydrofuryloxy) butane (particularly 1,4-bis(2-tetrahydrofuryloxy) butane) is representatively and preferably exemplified.

The heterocyclic ring including $R^{2a}$, $R^{2b}$, and $R^{2c}$ may contain a bonding group selected from —O—, —$SO_2$—, —CO—, —C(═O)O—, —N— and —S—.

For example, in a case where the heterocyclic ring is a dioxirane ring, the aliphatic group of $R^{2a}$, $R^{2b}$, and $R^{2c}$ is a methylene group having 1 carbon atom, and the methylene group and an oxygen atom of the heterocyclic ring are linked to each other by —O—. In addition, for example, in a case where the heterocyclic ring is a 1,3-dioxolane ring, the aliphatic group of $R^{2a}$, $R^{2b}$, and $R^{2c}$ is a methylene group and an ethylene group, and these groups and an oxygen atom of the heterocyclic ring are linked to each other by —O—. In addition, for example, in a case where the heterocyclic ring is an oxazolidine ring, the aliphatic group of $R^{2a}$, $R^{2b}$, and $R^{2c}$ is a methylene group and an ethylene group, and these groups and an oxygen atom of the heterocyclic ring are linked to each other by —N—. Although some examples of the heterocyclic ring containing a bonding group have been described, the present embodiment is not limited to these examples.

The number of carbon atoms in the case where the heterocyclic ring has a bonding group may be within the range of the number of carbon atoms of the aliphatic group of $R^{2a}$, $R^{2b}$, and $R^{2c}$.

The aliphatic group may be a group in which at least a part of hydrogen atoms is substituted with a halogen atom, a hydroxy group, or an amino group, or may be a group in which at least a part of hydrogen atoms is substituted with a monovalent aliphatic group.

Further, the heterocyclic ring in the general formula (2) may be a group in which an alicyclic ring and an aromatic ring are bonded or condensed. Here, the bonded heterocyclic ring is a ring in which another alicyclic ring or aromatic ring is bonded to at least one carbon atom of the heterocyclic ring in the general formula (2), and the condensed heterocyclic ring is a ring in which another alicyclic ring or aromatic ring is condensed to at least one carbon atom of the heterocyclic ring in the general formula (2). In the heterocyclic ring in the general formula (2), the bonded or condensed heterocyclic ring corresponds to the condensed ring described for the alicyclic group and the aromatic group in $X^1$ of the general formula (1), that is, the compound formed by bonding or condensing any one of the basic structure of the above-described single alicyclic ring, the basic structure of a plurality of alicyclic rings, or the basic structure of the above-described aromatic ring.

With respect to the number of carbon atoms in the case where the heterocyclic ring is formed by bonding or condensing an alicyclic ring and an aromatic ring, the number of carbon atoms of one alicyclic ring or aromatic ring may be within the range of the number of carbon atoms of the aliphatic group of $R^{2a}$, $R^{2b}$, and $R^{2c}$.

(Properties of Compound Having Two or More Heterocyclic Rings Having Carbon Atom and Oxygen Atom)

Regarding the properties of the above-described heteropolycyclic compound used in the present embodiment, the upper limit of the number average molecular weight is preferably 10,000 or less, more preferably 8,000 or less, still more preferably 7.000 or less, and even more preferably 6,500 or less, that is, the upper limit in the case where the polyfunctional epoxy compound is a compound represented by the general formula (1) and $X^1$ has the basic structure of —$R^1$O— as a bonding group. Further, the lower limit is preferably 80 or more.

The heteropolycyclic compound used in the present embodiment is preferably a compound having a relatively small number average molecular weight as shown in the above-described numerical range, and the content of the heteropolycyclic compound having a number average molecular weight of 10,000 or less in the total amount of the heteropolycyclic compound is preferably 90% by mass or more, more preferably 95% by mass or more, still more preferably 99% by mass or more, and even more preferably 100% by mass, that is, the total amount thereof is preferably a heterocyclic polycyclic compound having a number average molecular weight of 10,000 or less.

In addition, the content of the heteropolycyclic compound having a number average molecular weight of more than 10.000 in the total amount of the heteropolycyclic compound is preferably 10% by mass or less, more preferably 5% by mass or less, still more preferably 1% by mass or less, and even more preferably 0% by mass, that is, it is preferable that the heterocyclic polycyclic compound having a number average molecular weight of more than 10,000 is not contained.

The content of the compound (heteropolycyclic compound) having two or more heterocyclic rings each having a carbon atom and an oxygen atom and contained in the modified sulfide solid electrolyte may vary depending on the type of the heteropolycyclic compound to be used, and thus cannot be determined unconditionally, but the content is preferably 0.03 parts by mass or more, more preferably 0.05 parts by mass or more, still more preferably 0.1 parts by mass or more, and even more preferably 0.5 parts, and the upper limit thereof is preferably 25 parts by mass or less, and more preferably 20 parts by mass or less, relative to 100 parts by mass of the sulfide solid electrolyte. When the content is within the above range, coating suitability when coated as a paste can be efficiently improved, and excellent battery performance can be more efficiently obtained.

(Infrared Absorption Spectrum by FT-IR Spectroscopy)

The modified sulfide solid electrolyte of the present embodiment preferably has a peak at 2800 to 3000 $cm^{-1}$ in an infrared absorption spectrum obtained by FT-IR spectroscopy (ATR method).

Since this peak is not detected from the sulfide solid electrolyte, it is considered that the peak is a peak derived from the heterocyclic compound contained in the modified sulfide solid electrolyte. When the heteropolycyclic compound is present so as to be confirmed as a peak in an infrared absorption spectrum by FT-IR spectroscopy (ATR method), the oil absorption is reduced, excellent coating suitability is easily obtained, and excellent battery performance is more efficiently obtained.

In the description herein, the FT-IR spectroscopy is an analysis using a Fourier transform infrared spectrophotometer and means a measurement employing an attenuated total reflection method (ATR method), and the infrared absorption spectrum is a spectrum measured under the following conditions using an FT-IR apparatus.

Measurement method: attenuated total reflection method (ATR method)

Measurement wave number range: 650 to 4000 $cm^{-1}$

Illuminant: Globar lamp (SIC)

Detector: DTGS detector

Resolution: 4 $cm^{-1}$

Measurement time: 1 second/time

Number of integrations: 256

In the infrared absorption spectrum, the peak at 2800 to 3000 $cm^{-1}$ is known to be derived from C—H stretching vibration. The peak is considered to be a peak derived from the heteropolycyclic compound, and more specifically, the peak is derived from the C—H bond of the heteropolycyclic compound. Further, when the heteropolycyclic compound has an alkyl chain, the peak is derived from a C—H bond (C—H stretching vibration) of the alkyl chain in the heteropolycyclic compound.

In the modified sulfide solid electrolyte of the present embodiment, since the peak is clearly detected, it is considered that the heteropolycyclic compound is contained in an easily detectable form, that is, the heteropolycyclic compound is present so as to adhere to the surface of the sulfide solid electrolyte. In addition, it is considered that due to such a presence, the oil absorption of the sulfide solid electrolyte can be reduced, excellent coating suitability is easily obtained, and excellent battery performance is more efficiently obtained.

The modified sulfide solid electrolytes of the present embodiment preferably have a peak of 0.0 to 5.0 ppm derived from the alkyl chain of the heteropolycyclic compound in the $^1$H-NMR spectrum.

In the description herein, the peak by the $^1$H-NMR spectrum is measured under the following conditions using a nuclear magnetic resonance apparatus (NMR apparatus).

Observation nucleus: 1H

Resonance frequencies: 500 MHZ

Probe: 5 mmϕ TCI cryoprobe

Measurement temperature: 25° C.

Number of integrations: 16

The modified sulfide solid electrolyte of the present embodiment has a peak at 2800 to 3000 $cm^{-1}$ in the infrared absorption spectrum, and it is considered that the heteropolycyclic compound is present in an aspect in which the peak is clearly detected, that is, in such a manner that the heteropolycyclic compound adheres to the surface of the sulfide solid electrolyte. It is considered that even by the detection of the peak derived from the alkyl chain in the $^1$H-NMR spectrum and the presence in such a manner, similarly to the infrared absorption spectrum, the oil absorption of the sulfide solid electrolyte can be reduced, excellent coating suitability is easily obtained, and excellent battery performance is more efficiently obtained.

In addition, as shown in the Examples which will be described later, regarding the modified sulfide solid electrolyte obtained by mixing the sulfide solid electrolyte and the heteropolycyclic compound in an organic solvent, when the modified sulfide solid electrolyte is added to a solvent such as toluene and allowed to stand in a slurry state, and then the supernatant liquid thereof is analyzed by gas chromatography mass spectrometry (GC/MS method), no heteropolycyclic compound is detected, whereas regarding the precipitated powder, when the solvent is dried and removed, and then the powder is dissolved in deuterated methanol, and $^1$H-NMR measurement is performed, a chemical shift of a group (alkyl group or the like) derived from the heteropolycyclic compound is detected.

From this phenomenon, it is considered that in the modified sulfide solid electrolyte, the heteropolycyclic compound strongly adheres to the surface of the sulfide solid electrolyte, and the oil absorption is reduced by the adhesion, and the coating suitability becomes excellent.

In a case where the heteropolycyclic compound adheres to the surface of the sulfide solid electrolyte, the heteropolycyclic compound may adhere so as to cover the entire surface of the sulfide solid electrolyte or may adhere to a part of the sulfide solid electrolyte.

(Production of Sulfide Solid Electrolyte)

Next, the sulfide solid electrolyte forming the modified sulfide solid electrolyte of the present embodiment will be described. The sulfide solid electrolytes that can be used in the present embodiment are not particularly limited as long as they contain a lithium atom, a sulfur atom, a phosphorus atom, and a halogen atom and have a BET specific surface area of 10 $m^2$/g or more, and commercially available products thereof can be used, or the sulfide solid electrolytes can be produced to be used.

In a case where the sulfide solid electrolyte that can be used in the present embodiment is produced and used, a production method thereof will be described. The sulfide solid electrolyte that can be used in the present embodiment is obtained by, for example, a production method including mixing two or more raw materials selected from compounds containing at least one atom of a lithium atom, a sulfur atom, a phosphorus atom, and a halogen atom.

(Raw Material)

As the raw material, two or more compounds selected from compounds containing at least one atom of a lithium atom, a sulfur atom, a phosphorus atom, and a halogen atom can be adopted.

The compound that can be used as a raw material contains at least one atom of a lithium atom, a sulfur atom, a phosphorus atom, and a halogen atom, and more specifically, typical examples thereof include raw materials consisting of at least two kinds of atoms selected from the above four kinds of atoms, such as lithium sulfide; lithium halides such as lithium fluoride, lithium chloride, lithium bromide, and lithium iodide; alkali metal halides such as sodium halides such as sodium iodide, sodium fluoride, sodium chloride, and sodium bromide; phosphorus sulfides such as diphosphorus trisulfide ($P_2S_3$) and diphosphorus pentasulfide ($P_2S_5$); phosphorus halides such as various phosphorus fluorides ($PF_3$ and $PF_5$), various phosphorus chlorides ($PCl_3$, $PCl_5$, and $P_2Cl_4$), various phosphorus bromides ($PBr_3$ and $PBr_5$), and various phosphorus iodides ($PI_3$ and $P_2I_4$); and thiophosphoryl halides such as thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichloride fluoride ($PSCl_2F$), and thiophosphoryl dibromide fluoride ($PSBr_2F$); and halogen simple substances such as fluorine ($F_2$), chlorine ($Cl_2$), bromine ($Br_2$), and iodine ($I_2$), preferably bromine ($Br_2$) and iodine ($I_2$).

Examples of compounds that can be used as raw materials other than the above include compounds containing at least one kind of atom selected from the above four kinds of atoms and containing one or more atoms other than the four kinds of atoms, more specifically, lithium compounds such as lithium oxide, lithium hydroxide, and lithium carbonate; alkali metal sulfides such as sodium sulfide, potassium sulfide, rubidium sulfide, and cesium sulfide; metal sulfides such as silicon sulfide, germanium sulfide, boron sulfide, gallium sulfide, tin sulfide (SnS, $SnS_2$), aluminum sulfide, and zinc sulfide; phosphoric acid compounds such as sodium phosphate and lithium phosphate; metal halides such as aluminum halide, silicon halide, germanium halide, arsenic halide, selenium halide, tin halide, antimony halide, tellurium halide, and bismuth halide; and phosphorus oxyhalides such as phosphorus oxychloride ($POCl_3$) and phosphorus oxybromide ($POBr_3$).

In the present embodiment, from the viewpoint of more easily obtaining a sulfide solid electrolyte having high ion conductivity, among halogen atoms, a chlorine atom, a bromine atom, and an iodine atom are preferable, and a bromine atom and an iodine atom are more preferable. These atoms may be used alone or in combination of a plurality of kinds thereof. That is, taking lithium halide as an example, lithium bromide may be used alone, lithium iodide may be used alone, or lithium bromide and lithium iodide may be used in combination.

In addition, from the same viewpoint, as the compound that can be used as a raw material, among the above, lithium sulfide; phosphorus sulfides such as diphosphorus trisulfide ($P_2S_3$) and diphosphorus pentasulfide ($P_2S_5$); halogen simple substances such as fluorine ($F_2$), chlorine ($Cl_2$), bromine ($Br_2$), and iodine ($I_2$); and lithium halides such as lithium fluoride, lithium chloride, lithium bromide, and lithium iodide are preferable; among phosphorus sulfides, diphosphorus pentasulfide is preferable; among halogen simple substances, chlorine ($Cl_2$), bromine ($Br_2$), and iodine ($I_2$) are preferable; and among lithium halides, lithium chloride, lithium bromide, and lithium iodide are preferable.

As a combination of compounds that can be used as raw materials, for example, a combination of lithium sulfide, diphosphorus pentasulfide and lithium halide, and a combination of lithium sulfide, diphosphorus pentasulfide and a halogen simple substance are preferable. As the lithium halide, lithium bromide, lithium iodide, and lithium chloride are preferable, and as the halogen simple substance, chlorine, bromine, and iodine are preferable.

In a case where lithium sulfide is used as the compound containing a lithium atom in the present embodiment, it is preferable that the lithium sulfide is in the form of particles.

The average particle diameter ($D_{50}$) of the lithium sulfide particles is preferably 10 μm or more and 2,000 μm or less, more preferably 30 μm or more and 1,500 μm or less, and still more preferably 50 μm or more and 1,000 μm or less. In the description herein, the average particle diameter ($D_{50}$) is the particle diameter at which 50% of the total particle diameter is reached by sequentially integrating from the smallest particle when a particle size distribution integration curve is drawn, and the volume distribution is the average particle diameter that can be measured using, for example, a laser diffraction/scattering particle size distribution measuring apparatus. In addition, among the raw materials exemplified above, the solid raw material preferably has an average particle diameter similar to that of the lithium sulfide particles, that is, the average particle diameter of the solid raw material is preferably within the same range as the average particle diameter of the lithium sulfide particles.

When lithium sulfide, diphosphorus pentasulfide, and lithium halide are used as raw materials, the proportion of lithium sulfide to the total of lithium sulfide and diphosphorus pentasulfide is preferably 60 mol % or more, more preferably 65 mol % or more, and still more preferably 68 mol % or more, and the upper limit thereof is preferably 80 mol % or less, more preferably 78 mol % or less, and still more preferably 76 mol % or less, from the viewpoint of obtaining higher chemical stability and from the viewpoint of improving the $PS_4$ fraction and obtaining high ion conductivity.

When lithium sulfide, diphosphorus pentasulfide, lithium halide, and other raw materials used as necessary are used, the content of lithium sulfide and diphosphorus pentasulfide relative to the total thereof is preferably 60 mol % or more, more preferably 65 mol % or more, and still more preferably 70 mol % or more, and the upper limit thereof is preferably 100 mol % or less, more preferably 90 mol % or less, and still more preferably 80 mol % or less.

In addition, when lithium bromide and lithium iodide are used in combination as the lithium halide, the proportion of lithium bromide to the total of lithium bromide and lithium iodide is preferably 1 mol % or more, more preferably 20 mol % or more, still more preferably 40 mol % or more, and even more preferably 50 mol % or more, and the upper limit thereof is preferably 99 mol % or less, more preferably 90 mol % or less, still more preferably 80 mol % or less, and even more preferably 70 mol % or less, from the viewpoint of improving the $PS_4$ fraction and obtaining high ion conductivity.

When a halogen simple substance is used as a raw material and lithium sulfide or diphosphorus pentasulfide is used, the proportion of the number of moles of lithium sulfide excluding lithium sulfide having the same number of moles as the halogen simple substance to the total number of moles of lithium sulfide excluding lithium sulfide having the same number of moles as the halogen simple substance and diphosphorus pentasulfide is preferably in the range of 60 to 90%, more preferably in the range of 65 to 85%, still more preferably in the range of 68 to 82%, even more preferably in the range of 72 to 78%, and particularly preferably in the range of 73 to 77%. This is because a higher ion conductivity can be obtained at these proportions. In addition, from the same viewpoint, when lithium sulfide, diphosphorus pentasulfide, and a halogen single substance are used, the content of the halogen single substance relative to the total amount of lithium sulfide, diphosphorus pentasulfide, and the halogen single substance is preferably 1 to 50 mol %, more preferably 2 to 40 mol %, still more preferably 3 to 25 mol %, and even more preferably 3 to 15 mol %.

When lithium sulfide, diphosphorus pentasulfide, a halogen simple substance, and a lithium halide are used, the content (a mol %) of the halogen simple substance and the content (B mol %) of the lithium halide relative to the total amount thereof preferably satisfy the following formula (1), more preferably satisfy the following formula (2), still more preferably satisfy the following formula (3), and even more preferably satisfy the following formula (4).

$$2 \leq 2\alpha + \beta \leq 100 \quad (1)$$

$$4 \leq 2\alpha + \beta \leq 80 \quad (2)$$

-continued $$6 \leq 2\alpha + \beta \leq 50 \quad (3)$$

$$6 \leq 2\alpha + \beta \leq 30 \quad (4)$$

(Mixing)

Mixing of two or more kinds of raw materials selected from compounds containing at least one atom of a lithium atom, a sulfur atom, a phosphorus atom, and a halogen atom can be carried out, for example, by using a mixer. It can also be performed by using a stirrer, a pulverizer, or the like.

This is because mixing of the raw materials can occur even when a stirrer is used, and when a pulverizer is used, pulverization of the raw materials occurs, but mixing also occurs at the same time. That is, it can be said that the sulfide solid electrolyte used in the present embodiment can be obtained by stirring, mixing, pulverization, or a combination thereof two or more kinds of raw materials selected from compounds containing at least one atom of a lithium atom, a sulfur atom, a phosphorus atom, and a halogen atom.

Examples of the stirrer and the mixer include a mechanical stirring type mixer provided with a stirring blade in a reaction tank and capable of stirring (which may also be referred to as mixing by stirring or stirring and mixing). Examples of the mechanical stirring type mixer include a high-speed stirring type mixer and a double-arm type mixer. Further, examples of the high-speed stirring type mixer include a vertical shaft rotation type mixer and a horizontal shaft rotation type mixer, and either of mixer may be used.

Examples of the shape of the stirring blade used in the mechanical stirring type mixer include a blade type, an arm type, an anchor type, a paddle type, a full-zone type, a ribbon type, a multi-stage blade type, a double-arm type, a shovel type, a twin-screw blade type, a flat blade type, and a C-type blade type. From the viewpoint of more efficiently promoting the reaction of raw materials, a shovel type, a flat blade type, a C-type blade type, an anchor type, a paddle type, and a full-zone type are preferable, and an anchor type, a paddle type, and a full-zone type are more preferable.

In a case where a mechanical stirring type mixer is used, the rotation speed of the stirring blade may be appropriately adjusted according to the volume and temperature of the fluid in the reaction tank, the shape of the stirring blade, and the like, and is not particularly limited, and is usually about 5 rpm or more and 400 rpm or less, and from the viewpoint of more efficiently promoting the reaction of the raw materials, the rotation speed is preferably 10 rpm or more and 300 rpm or less, more preferably 15 rpm or more and 250 rpm or less, and still more preferably 20 rpm or more and 200 rpm or less.

The temperature condition at the time of mixing using a mixer is not particularly limited, and is, for example, usually-30 to 120° C., preferably-10 to 100° C., more preferably 0 to 80° C., and still more preferably 10 to 60° C. In addition, the mixing time is usually 0.1 to 500 hours, and is preferably 1 to 450 hours, more preferably 10 to 425 hours, still more preferably 20 to 400 hours, and even more preferably 40 to 375 hours from the viewpoint of making the dispersion state of the raw materials more uniform and promoting the reaction.

The method for performing mixing accompanied by pulverization using a pulverizer is a method which has been conventionally adopted as a solid phase method (mechanical milling method). As the pulverizer, for example, a media type mill using a pulverization medium can be used.

The media type mill is roughly classified into a container driving-type mill and a media agitating-type mill. Examples of the container driving-type mill include a ball mill and a bead mill including a stirring tank, a pulverization tank, or a combination thereof. Examples of the media agitating-type mill include various pulverizers such as an impact type pulverizer such as a cutter mill, a hammer mill, and a pin mill: a tower type pulverizer such as a tower mill: a stirring tank type pulverizer such as an attritor, an aquamizer, and a sand grinder: a flow tank type pulverizer such as a visco mill and a pearl mill; a flow tube type pulverizer: an annular type pulverizer such as a Co-ball mill: a continuous dynamic type pulverizer; and a single-shaft or multi-shaft kneader. Among these, a ball mill and a bead mill exemplified as the container driving-type mill are preferable in consideration of ease of adjustment of the particle size of the obtained sulfide, and among these, a planetary type mill is preferable.

These pulverizers can be appropriately selected according to the desired scale and the like, and if they are relatively small-scale, the container driving-type mills such as a ball mill and a bead mill can be used, and in the case of large-scale or mass production, other types of pulverizers may be used.

Further, as will be described later, in the case of a liquid state accompanied by a liquid such as a solvent at the time of mixing or a slurry state, a wet pulverizer capable of corresponding to wet pulverization is preferable.

Representative examples of the wet pulverizer include a wet bead mill, a wet ball mill, and a wet vibration mill, and a wet bead mill using beads as pulverization media is preferable from the viewpoint that the conditions of the pulverization operation can be freely adjusted and it is easy to correspond to those having a smaller particle diameter. Further, it is also possible to use a dry pulverizer such as a dry media type mill such as a dry bead mill, a dry ball mill, or a dry vibration mill, or a dry non-media type mill such as a jet mill.

In addition, in a case where an object to be mixed is in a liquid state or a slurry state, it is also possible to use a circulation type pulverizer capable of performing a circulating operation for circulation as necessary. Specific examples thereof include a pulverizer having a form in which a slurry is circulated between a pulverizer (pulverization mixer) for pulverizing the slurry and a temperature holding tank (reactor container).

The size of the beads and balls used in the ball mill and the bead mill may be appropriately selected according to the desired particle size, the processing amount, and the like, and for example, the diameter of the beads is usually 0.05 mmϕ or more, preferably 0.1 mmϕ or more, and more preferably 0.3 mmϕ or more, and the upper limit thereof is usually 5.0 mmϕ or less, preferably 3.0 mmϕ or less, and more preferably 2.0 mmϕ or less. The diameter of the ball is usually 2.0 mmϕ or more, preferably 2.5 mmϕ or more, and more preferably 3.0 mmϕ or more, and the upper limit thereof is usually 20.0 mmϕ or less, preferably 15.0 mmϕ or less, and more preferably 10.0 mmϕ or less.

Examples of the material include metals such as stainless steel, chrome steel, and tungsten carbide; ceramics such as zirconia and silicon nitride; and minerals such as agate.

In addition, in a case where a ball mill or a beads mill is used, the rotation speed is usually 10 rpm or more, preferably 20 rpm or more, and more preferably 50 rpm or more, and the upper limit thereof is usually 1,000 rpm or less, preferably 900 rpm or less, more preferably 800 rpm or less, and still more preferably 700 rpm or less, although it cannot be determined unconditionally because the rotation speed varies depending on the scale of the treatment.

The pulverization time in this case varies depending on the scale of the treatment, and thus cannot be determined unconditionally, but is usually 0.5 hours or more, preferably 1 hour or more, more preferably 5 hours or more, and still more preferably 10 hours or more, and the upper limit thereof is usually 100 hours or less, preferably 72 hours or less, more preferably 48 hours or less, and still more preferably 36 hours or less.

By selecting the size and material of the medium (beads or balls) to be used, the rotation speed of the rotor, the time, and the like, mixing, stirring, pulverization, or a treatment combining any of these can be performed, and the particle diameter and the like of the sulfide to be obtained can be adjusted.

(Solvent)

In the above mixing, a solvent can be added to the above raw materials. As the solvent, various solvents widely referred to as organic solvents can be used.

As the solvent, a wide variety of solvents conventionally used in the production of solid electrolytes can be used, and examples thereof include hydrocarbon solvents such as an aliphatic hydrocarbon solvent, an alicyclic hydrocarbon solvent, and an aromatic hydrocarbon solvent.

Examples of the aliphatic hydrocarbon include hexane, pentane, 2-ethylhexane, heptane, octane, decane, undecane, dodecane, and tridecane; examples of the alicyclic hydrocarbon include cyclohexane and methylcyclohexane; and examples of the aromatic hydrocarbon solvent include benzene, toluene, xylene, mesitylene, ethylbenzene, tert-butylbenzene, trifluoromethylbenzene, and nitrobenzene.

In addition to the above-described hydrocarbon solvents, solvents containing an atom other than a carbon atom and a hydrogen atom, for example, a heteroatom such as a nitrogen atom, an oxygen atom, a sulfur atom, and a halogen atom are also exemplified. Such a solvent has a property of easily forming a complex with a compound or the like containing a lithium atom, a phosphorus atom, a sulfur atom, and a halogen atom used as a raw material (hereinafter, such a solvent is also referred to as a “complexing agent”), and has a property of easily retaining a halogen atom in the structure of the sulfide solid electrolyte, and thus is useful in that higher ion conductivity is obtained. Preferred examples of such a complexing agent include an alcohol solvent, an aldehyde solvent, and a ketone solvent, as well as an ether solvent and an ester solvent, each of which contains an oxygen atom as a hetero atom.

Preferred examples of the ether solvent include aliphatic ethers such as dimethyl ether, diethyl ether, tert-butyl methyl ether, dimethoxymethane, dimethoxyethane, diethylene glycol dimethyl ether (diglyme), triethylene oxide glycol dimethyl ether (triglyme), diethylene glycol, and triethylene glycol; alicyclic ethers such as ethylene oxide, propylene oxide, tetrahydrofuran, tetrahydropyran, dimethoxytetrahydrofuran, cyclopentyl methyl ether, and dioxane: heterocyclic ethers such as furan, benzofuran, and benzopyran; and aromatic ethers such as methyl phenyl ether (anisole), ethyl phenyl ether, dibenzyl ether, and diphenyl ether.

Preferred examples of the ester solvent include methyl formate, ethyl formate, methyl acetate, ethyl acetate, propyl acetate, isopropyl acetate: aliphatic esters such as methyl propionate, ethyl propionate, dimethyl oxalate, diethyl oxalate, dimethyl malonate, diethyl malonate, dimethyl succinate, and diethyl succinate; alicyclic esters such as methyl cyclohexanecarboxylate, ethyl cyclohexanecarboxylate, and dimethyl cyclohexanedicarboxylate: heterocyclic esters such as methyl pyridinecarboxylate, methyl pyrimidinecarboxylate, acetolactone, propiolactone, butyrolactone, and valerolactone; and aromatic esters such as methyl benzoate, ethyl benzoate, dimethyl phthalate, diethyl phthalate, butylbenzyl phthalate, dicyclohexyl phthalate, trimethyl trimellitate, and triethyl trimellitate.

In addition, alcohol solvents such as ethanol and butanol: aldehyde solvents such as formaldehyde, acetaldehyde, and dimethylformamide: ketone solvents such as acetone and methyl ethyl ketone; and the like are preferably exemplified.

Examples of the solvent containing a nitrogen atom as a hetero atom include solvents having a group containing a nitrogen atom, such as an amino group, an amido group, a nitro group, and a nitrile group.

For example, preferred examples of the solvent having an amino group include aliphatic amines such as ethylenediamine, diaminopropane, dimethylethylenediamine, diethylethylenediamine, dimethyldiaminopropane, tetramethyldiaminomethane, tetramethylethylenediamine (TMEDA), and tetramethyldiaminopropane (TMPDA): alicyclic amines such as cyclopropanediamine, cyclohexanediamine, and bisaminomethylcyclohexane; heterocyclic amines such as isophoronediamine, piperazine, dipiperidylpropane, and dimethylpiperazine; and aromatic amines such as phenyldiamine, tolylenediamine, naphthalenediamine, methylphenylenediamine, dimethylnaphthalenediamine, dimethylpheny lenediamine, tetramethylphenylenediamine, and tetramethylnaphthalenediamine.

Nitrile solvents such as acetonitrile and acrylonitrile; and solvents containing a nitrogen atom, such as dimethylformamide, nitrobenzene, and dimethylacetamide are also preferably exemplified.

Preferred examples of the solvent containing a halogen atom as a hetero atom include chloroform, carbon tetrachloride, dichloromethane, chlorobenzene, trifluoromethylbenzene, chlorobenzene, chlorotoluene, and bromobenzene.

Preferred examples of the solvent containing a sulfur atom include dimethyl sulfoxide and carbon disulfide.

When the solvent is used, the amount of the solvent used is preferably 100 mL or more, more preferably 200 mL or more, still more preferably 250 mL or more, and even more preferably 300 mL or more, and the upper limit thereof is preferably 3.000 mL or less, more preferably 2,500 mL or less, still more preferably 2,000 mL or less, and even more preferably 1.550 mL or less relative to 1 kg of the total amount of raw materials. When the amount of the solvent used is within the above range, the raw materials can be efficiently reacted.

(Drying)

When the mixing is performed using a solvent, it may include performing the mixing and then drying the fluid (usually a slurry) obtained by the mixing. When a complexing agent is used as the solvent, the sulfide solid electrolyte can be obtained by removing the complexing agent from the complex containing the complexing agent, when the complexing agent and the solvent are used in combination, by removing the complexing agent from the complex containing the complexing agent and removing the solvent, and when a solvent other than the complexing agent is used, by removing the solvent. The obtained sulfide solid electrolyte exhibits ion conductivity caused by lithium atoms.

The drying can be performed at a temperature corresponding to the type of the solvent on the fluid obtained by mixing. For example, the drying can be performed at a temperature equal to or higher than the boiling point of the complexing agent.

The drying can be performed by drying under reduced pressure (vacuum drying) at about 5 to 100° C., preferably 10 to 85° C., more preferably 15 to 70° C., and still more preferably at about room temperature (23° C.) (for example, room temperature±about 5° C.) using vacuum pumps or the like to volatilize the complexing agent and solvents used as necessary.

The drying may be performed by filtration of the fluid using a glass filter or the like, solid-liquid separation by decantation, or solid-liquid separation using a centrifugal separator or the like. When a solvent other than the complexing agent is used, the sulfide solid electrolyte is obtained by solid-liquid separation. When a complexing agent is used as the solvent, solid-liquid separation is performed, and then drying may be performed under the above temperature conditions to remove the complexing agent incorporated into the complex.

In the solid-liquid separation, to be specific, decantation for removing a complexing agent and a solvent which become a supernatant after transferring a fluid to a container and precipitating a sulfide (or a complex (which can also be referred to as a precursor of a sulfide solid electrolyte) in a case where a complexing agent is contained)), or filtration using a glass filter having a pore size of, for example, about 10 to 200 μm, preferably 20 to 150 μm is easy.

The drying may be performed after the mixing and before the hydrogen treatment to be described later, or may be performed after the hydrogen treatment is performed.

The sulfide solid electrolyte obtained by performing the mixing described above, or in a case where a solvent is used, the sulfide solid electrolyte obtained by removing the solvent by the drying described above exhibits ion conductivity caused by lithium atoms.

The sulfide solid electrolyte obtained by performing the mixing is basically an amorphous sulfide solid electrolyte (glass component) unless, for example, mixing by pulverization using a pulverizer is performed to such an extent that crystallization occurs.

The sulfide solid electrolyte obtained by performing the mixing may be an amorphous sulfide solid electrolyte (glass component) or a crystalline sulfide solid electrolyte, and can be appropriately selected as desired. In the case of producing a crystalline sulfide solid electrolyte, the crystalline sulfide solid electrolyte can be obtained by heating the amorphous sulfide solid electrolyte obtained by the mixing.

The sulfide solid electrolyte may also include a crystalline sulfide solid electrolyte in which an amorphous component (glass component) is formed on the surface of the crystalline sulfide solid electrolyte as a result of performing a treatment such as pulverization, which will be described later, for example, in order to adjust the particle size of the crystalline sulfide solid electrolyte powder. Therefore, the sulfide solid electrolyte containing an amorphous component also includes an amorphous sulfide solid electrolyte and a sulfide solid electrolyte which is a crystalline sulfide solid electrolyte and in which an amorphous component is formed on the surface thereof.

(Heating)

When a crystalline sulfide solid electrolyte is produced, the method may further include heating. In the case where an amorphous sulfide solid electrolyte (glass component) is obtained by performing the mixing as described above, a crystalline sulfide solid electrolyte is obtained by heating, and in the case where a crystalline sulfide solid electrolyte is obtained, a crystalline sulfide solid electrolyte having further improved crystallinity is obtained.

In addition, when a complexing agent is used as a solvent at the time of performing mixing, a complex containing the complexing agent is formed, but by heating without performing the drying described above, the complexing agent is removed from the complex, and a sulfide solid electrolyte is obtained, and depending on the heating conditions, an amorphous solid electrolyte or a crystalline solid electrolyte can be obtained.

For example, the heating temperature for obtaining the amorphous sulfide solid electrolyte may be determined according to the structure of the crystalline sulfide solid electrolyte obtained by heating the amorphous sulfide solid electrolyte. To be specific, when the amorphous sulfide solid electrolyte is subjected to differential thermal analysis (DTA) using a differential thermal analyzer (DTA apparatus) at a heating rate of 10° C./min, the heating temperature is preferably 5° C., or lower, more preferably 10° C., or lower, and still more preferably 20° C., or lower, based on the peak top temperature of the exothermic peak observed on the lowest temperature side. The lower limit is not particularly limited and may be about-40° C., or higher of the peak top temperature of the exothermic peak observed on the lowest temperature side. By setting the temperature in such a range, an amorphous sulfide solid electrolyte can be obtained more efficiently and reliably. The heating temperature for obtaining the amorphous sulfide solid electrolyte varies depending on the structure of the obtained crystalline sulfide solid electrolyte and thus cannot be defined unconditionally, and is usually preferably 135° C., or lower, more preferably 130° C., or lower, and still more preferably 125° C., or lower, and the lower limit thereof is not particularly limited, and is preferably 90° C., or higher, more preferably 100° C., or higher, and still more preferably 105° C., or higher.

When the amorphous sulfide solid electrolyte is heated to obtain the crystalline sulfide solid electrolyte, the heating temperature may be determined according to the structure of the crystalline sulfide solid electrolyte, and is preferably higher than the above-described heating temperature for obtaining the amorphous sulfide solid electrolyte. To be specific, when the amorphous sulfide solid electrolyte is subjected to differential thermal analysis (DTA) using a differential thermal analyzer (DTA apparatus) at a heating rate of 10° C./min, the heating temperature is preferably 5° C., or higher, more preferably 10° C., or higher, and still more preferably 20° C., or higher, and the upper limit thereof is not particularly limited and may be about 40° C., or lower, based on the peak top temperature of the exothermic peak observed on the lowest temperature side. By setting the temperature in such a range, a crystalline sulfide solid electrolyte can be obtained more efficiently and reliably. The heating temperature for obtaining the crystalline sulfide solid electrolyte varies depending on the composition and structure of the obtained crystalline sulfide solid electrolyte, thus cannot be defined unconditionally, and is usually preferably 130° C., or higher, more preferably 135° C., or higher, and still more preferably 140° C., or higher, and the upper limit thereof is not particularly limited, but is preferably 600° C., or lower, more preferably 550° C., or lower, and still more preferably 500° C., or lower.

The heating time is not particularly limited as long as a desired amorphous sulfide solid electrolyte and crystalline sulfide solid electrolyte can be obtained. For example, the heating time is preferably 1 minute or more, more preferably 10 minutes or more, still more preferably 30 minutes or more, and even more preferably 1 hour or more. The upper limit of the heating time is not particularly limited, and is preferably 24 hours or less, more preferably 10 hours or less, still more preferably 5 hours or less, and even more preferably 3 hours or less.

Further, the heating is preferably performed in an inert gas atmosphere (for example, a nitrogen atmosphere or an argon atmosphere) or a reduced pressure atmosphere (in particular, a vacuum). For example, an inert gas atmosphere containing hydrogen having a constant concentration may be used. This is because deterioration (for example, oxidation) of the crystalline sulfide solid electrolyte can be prevented.

The heating method is not particularly limited, and examples thereof include a method using a hot plate, a vacuum heating apparatus, an argon gas atmosphere furnace, and a firing furnace. In addition, industrially, a horizontal dryer having a heating means and a feed mechanism, a horizontal vibration flow dryer, or the like can be used, and may be selected according to the amount of treatment to be heated.

(Sulfide Solid Electrolyte)

As described above, the sulfide solid electrolyte used in the present embodiment may be a commercially available product or a manufactured product.

The sulfide solid electrolyte obtained by the above-described method is an amorphous (glass component) or crystalline sulfide solid electrolyte containing a lithium atom, a sulfur atom, a phosphorus atom, and a halogen atom, and is suitably used as the sulfide solid electrolyte in the present embodiment.

(BET Specific Surface Area)

The specific surface area of the sulfide solid electrolyte used in the present embodiment has a BET specific surface area of 10 $m^2/g$ or more. Although the modified sulfide solid electrolyte of the present embodiment has such a large specific surface area, the modified sulfide solid electrolyte of the present embodiment is excellent in coating suitability when coated as a paste, and exhibits an effect of efficiently exhibiting excellent battery performance. The higher the BET specific surface area of the sulfide solid electrolyte is, the more superiority of the effect can be exhibited. From such a viewpoint, the BET specific surface area is preferably 12 $m^2/g$ or more, more preferably 15 $m^2/g$ or more, and still more preferably 20 $m^2/g$ or more. From the same viewpoint, the upper limit thereof is not particularly limited, and is practically 100 $m^2/g$ or less, preferably 75 $m^2/g$ or less, and more preferably 50 $m^2/g$ or less.

In the description herein, the BET specific surface area is a specific surface area measured in accordance with JIS Z 8830:2013 (Determination of the specific surface area of powders (solids) by gas adsorption-BET method) using krypton as an adsorbate.

(Amorphous Sulfide Solid Electrolyte)

The amorphous sulfide solid electrolyte obtained by the above method contains a lithium atom, a sulfur atom, a phosphorus atom, and a halogen atom, and typical examples thereof include solid electrolytes composed of lithium sulfide, phosphorus sulfide, and a lithium halide, such as $Li_2S—P_2S_5—LiI$, $Li_2S—P_2S_5—LiCl$, $Li_2S—P_2S_5—LiBr$, and $Li_2S—P_2S_5—LiI—LiBr$; and solid electrolytes further containing other atoms such as an oxygen atom and a silicon atom, such as $Li_2S—P_2S_5—Li_2O—LiI$ and $Li_2S$-SiS2-$P_2S_5$—LiI. From the viewpoint of obtaining higher ion conductivity, solid electrolytes composed of lithium sulfide, phosphorus sulfide, and a lithium halide, such as $Li_2S—P_2S_5—LiI$, $Li_2S—P_2S_5—LiCl$, $Li_2S—P_2S_5—LiBr$, and $Li_2S—P_2S_5—LiI—LiBr$, are preferably exemplified.

The types of atoms constituting the amorphous sulfide solid electrolyte can be confirmed by, for example, an ICP emission spectrophotometer.

The shape of the amorphous sulfide solid electrolyte is not particularly limited, and examples thereof include a particulate shape. The average particle diameter ($D_{50}$) of the particulate amorphous sulfide solid electrolyte can be, for example, in the range of 0.01 μm to 500 μm and 0.1 μm to 200 μm.

(Crystalline Sulfide Solid Electrolyte)

The crystalline sulfide solid electrolyte obtained by the above method may be a so-called glass ceramic obtained by heating an amorphous solid electrolyte to a crystallization temperature or higher, and examples of the crystal structure include a $Li_3PS_4$ crystal structure, a $Li_4P_2S_6$ crystal structure, a $Li_2PS_6$ crystal structure, a $Li_7P_3S_{11}$ crystal structure, and a crystal structure having peaks in the vicinity of 2θ=20.2° and in the vicinity of 23.6° (for example, JP 2013-16423 A).

In addition, sulfide solid electrolytes having a crystal structure such as a $Li_{4-x}Ge_{1-x}P_xS_4$ thio-LISICON Region II type crystal structure (see Kanno et al., Journal of The Electrochemical Society, 148 (7) A742-746 (2001)), a crystal structure similar to a $Li_{4-x}Ge_{1-x}P_xS_4$ thio-LISICON Region II type crystal structure (see Solid State Ionics, 177 (2006), 2721-2725), and the like can also be mentioned. The crystal structure of the crystalline sulfide solid electrolyte obtained by the production method of the present embodiment is preferably a thio-LISICON Region II type crystal structure among the above from the viewpoint that higher ion conductivity is obtained. Here, the "thio-LISICON Region II type crystal structure" indicates any one of a $Li_{4-x}Ge_{1-x}P_xS_4$ thio-LISICON Region II type crystal structure and a crystal structure similar to a $Li_{4-x}Ge_{1-x}P_xS_4$ thio-LISICON Region II type crystal structure. Further, the crystalline sulfide solid electrolyte obtained by the production method of the present embodiment may have the above-described thio-LISICON region II type crystal structure or may have it as a main crystal, and from the viewpoint of obtaining a higher ion conductivity, it is preferable that the crystalline sulfide solid electrolyte has it as a main crystal. In the description herein, the expression "having as a main crystal" means that the proportion of a target crystal structure in the crystal structure is 80% or more, and is preferably 90% or more and more preferably 95% or more. In addition, from the viewpoint of obtaining higher ion conductivity, it is preferable that the crystalline sulfide solid electrolytes obtained by the production method of the present embodiment do not contain crystalline $Li_3PS_4$ (β-$Li_3PS_4$).

In X-ray diffraction measurement using CuKα rays, diffraction peaks of the $Li_4PS_4$ crystal structure appear, for example, at around 2θ=17.5°, 18.3°, 26.1°, 27.3°, and 30.0°, diffraction peaks of the $Li_4P_2S_6$ crystal structure appear, for example, at around 2θ=16.9°. 27.1°, and 32.5°, diffraction peaks of the $Li_7PS_6$ crystal structure appear, for example, at around 2θ=15.3°, 25.2°, 29.6°, and 31.0°, diffraction peaks of the $Li_7P_3S_{11}$ crystal structure appear, for example, at around 2θ=17.8°, 18.5°. 19.7°, 21.8°, 23.7°, 25.9°, 29.6°, and 30.0°, diffraction peaks of the $Li_{4-x}Ge_{1-x}P_xS_4$ thio-LISICON Region II type crystal structure appear, for example, at around 2θ=20.1°, 23.9°, and 29.5°, and diffraction peaks of a crystal structure similar to the $Li_{4-x}Ge_{1-x}P_xS_4$ thio-LISICON Region II type crystal structure appear, for example, at around 2θ =20.2° and 23.6°. In addition, these peak positions may be shifted within a range of +0.5°.

As described above, when the thio-LISICON Region II type crystal structure is obtained in the present embodiment, it is preferable that the crystalline $Li_3PS_4$ ($\beta$-$Li_3PS_4$) is not contained. The sulfide solid electrolytes obtained by the production method of the present embodiment do not have the diffracted peaks at 2θ=17.5° and 26.1° which are observed in the crystalline $Li_3PS_4$, or even if they have the diffracted peaks, the extremely small peaks are detected as compared with the diffracted peaks of the thio-LISICON Region II type crystal structure.

The crystal structure represented by the composition formulas $Li_{7-x}P_{1-y}Si_yS_6$ and $Li_{7+x}P_{1-y}Si_yS_6$ (x is −0.6 to 0.6 and y is 0.1 to 0.6), which has the structural skeleton of $Li_7PS_6$ and in which a part of P is substituted with Si, is cubic or orthorhombic, preferably cubic, and has peaks mainly at positions of 2θ=15.5°, 18.0°, 25.0°, 30.0°, 31.4°, 45.3°, 47.0°, and 52.0° in X-ray diffraction measurement using CuKα rays. The crystal structure represented by the composition formula $Li_{7-x-2y}PS_{6-x-y}Cl_x$ ($0.8 \leq x \leq 1.7$, $0 < y \leq -0.25x \div 0.5$) is preferably cubic, and has peaks mainly at positions of 2θ=15.5°. 18.0°, 25.0°, 30.0°, 31.4°, 45.3°, 47.0°, and 52.0° in X-ray diffraction measurement using CuKα rays. The crystal structure represented by the composition formula $Li_{7-x}PS_{6-x}Ha_x$ (Ha is Cl or Br, x is preferably 0.2 to 1.8) is preferably cubic, and has peaks mainly at positions of 2θ=15.5°, 18.0°, 25.0°, 30.0°, 31.4°, 45.3°, 47.0°, and 52.0° in X-ray diffraction measurement using CuKα rays. The crystal structure basically having the structural skeleton of $Li_2PS_6$ is also referred to as Argyrodite-type crystal structure.

In addition, these peak positions may be shifted within a range of +0.5°.

The shape of the crystalline sulfide solid electrolyte is not particularly limited, and examples thereof include a particulate shape. The average particle diameter ($D_{50}$) of the particulate crystalline sulfide solid electrolyte can be, for example, in the range of 0.01 μm to 500 μm and 0.1 μm to 200 μm.

(Properties of Modified Sulfide Solid Electrolyte)

The modified sulfide solid electrolyte of the present embodiment has a BET specific surface area of 10 $m^2$/g or more and has a large specific surface area. The BET specific surface area of the sulfide solid electrolyte is preferably 12 $m^2$/g or more, more preferably 15 $m^2$/g or more, and still more preferably 20 $m^2$/g or more, from the viewpoint that the higher the BET specific surface area is, the more superiority of the effect can be exhibited. From the same viewpoint, the upper limit thereof is not particularly limited, and is practically 100 $m^2$/g or less, preferably 75 $m^2$/g or less, and more preferably 50 $m^2$/g or less.

Even in a case where the heteropolycyclic compound adheres to the surface of the sulfide solid electrolyte, the BET specific surface area of the sulfide solid electrolyte is not significantly affected, and the BET specific surface area of the sulfide solid electrolyte used in the present embodiment and the BET specific surface area of the modified sulfide solid electrolyte are substantially the same Therefore, when sulfide solid electrolytes having a BET specific surface area of 10 $m^2$/g or more are used, the modified sulfide solid electrolytes naturally have a BET specific surface area of 10 $m^2$/g or more.

The modified sulfide solid electrolyte of the present embodiment has a large BET specific surface area as described above, but has a small oil absorption of usually less than 0.9 mL/g, further 0.85 mL/g or less, or less than 0.80 mL/g due to the effect of the heteropolycyclic compound adhering to the surface. Since the modified sulfide solid electrolyte of the present embodiment has a small oil absorption in spite of a large BET specific surface area, it is possible to suppress an increase in the viscosity of the paste when the modified sulfide solid electrolyte is made into a paste, and excellent coating suitability is obtained when the modified sulfide solid electrolyte is coated. Further, it is not necessary to use a solvent or the like in order to suppress an increase in the viscosity of the paste, and thus excellent battery performance is easily obtained.

In the description herein, regarding the oil absorption, 1 g of the modified sulfide solid electrolyte was used as a sample, an operation of adding one drop of butyl butyrate in a mortar or the like and stirring with a spatula was performed, and the operation was repeated until the sample became a paste state, and the total amount of added butyl butyrate was taken as the oil absorption (mL/g). Here, the "paste state" means a state of "being able to be spread without cracking or crumbling and being lightly attached to a measurement plate" defined in "7.2 Measurement" of JIS K 5101-13-1:2004 (Test methods for pigments-Part 13: Oil absorption-Section 1: Refined linseed oil method).

In addition, the ion conductivity of the modified sulfide solid electrolyte of the present embodiment is usually 0.5 mS/cm or more, and further 1.0 mS/cm or more, 1.5 mS/cm or more, 2.0 mS/cm or more, or 2.5 mS/cm or more, which is extremely high ion conductivity, and a lithium battery having excellent battery performance is obtained.

(Use)

The modified sulfide solid electrolyte of the present embodiment is excellent in coating suitability and can be used for the production of a battery without using a solvent or the like, and therefore can efficiently exhibit excellent battery performance. Further, since the modified sulfide solid electrolyte has high ion conductivity and excellent battery performance, the modified sulfide solid electrolyte is suitably used in a battery.

The modified sulfide solid electrolyte of the present embodiment may be used in a positive electrode layer, may be used in a negative electrode layer, or may be used in an electrolyte layer. Each layer can be produced by a known method.

In addition to the positive electrode layer, the electrolyte layer, and the negative electrode layer, it is preferable to use a current collector as the above battery, and a known current collector can be used. For example, a layer obtained by coating a material that reacts with the solid electrolyte, such as Au, Pt, Al, Ti, or Cu, with Au or the like can be used.

(Method for Producing Modified Sulfide Solid Electrolyte)

The method for producing a modified sulfide solid electrolyte of the present embodiment is a production method including: mixing a sulfide solid electrolyte having a BET specific surface area of 10 $m^2$/g or more and containing a lithium atom, a sulfur atom, a phosphorus atom, and a halogen atom, a compound having two or more heterocyclic rings each having a carbon atom and an oxygen atom, and an organic solvent; and removing the organic solvent. According to the production method of the present embodiment, it is possible to efficiently produce the modified sulfide solid electrolyte of the present embodiment, that is, it is preferable that the modified sulfide solid electrolyte of the present embodiment is produced by the production method of the present embodiment.

As the sulfide solid electrolyte having a BET specific surface area of 10 $m^2$/g or more and containing a lithium atom, a sulfur atom, a phosphorus atom, and a halogen atom, which is used in the production method of the present embodiment, the same sulfide solid electrolyte as described above as being capable of being used in the modified sulfide solid electrolyte of the present embodiment is employed. Therefore, as the sulfide solid electrolyte, a commercially available product may be used, or a product produced by the method of the sulfide solid electrolyte described above can be used.

Examples of the organic solvent used in the production method of the present embodiment include the solvents as described above as being capable of being used in the method for producing a sulfide solid electrolyte. From the viewpoint of accelerating the mixing of the sulfide solid electrolyte and the heteropolycyclic compound to efficiently obtain a modified sulfide solid electrolyte containing the sulfide solid electrolyte and the heteropolycyclic compound, and further from the viewpoint of accelerating the adhesion of the heteropolycyclic compound to the sulfide solid electrolyte, among the solvents described above, an aliphatic hydrocarbon solvent, an alicyclic hydrocarbon solvent, an aromatic hydrocarbon solvent, or an ether solvent, an ester solvent, or a nitrile solvent exemplified as the complexing agent is preferably used, and an aromatic hydrocarbon solvent is more preferably used.

In the production method of the present embodiment, these organic solvents may be used alone or in combination of two or more thereof.

In the production method of the present embodiment, the method for mixing the sulfide solid electrolyte, the heteropolycyclic compound, and the organic solvent can be performed by the same method as the "(Mixing)" in the method for producing the sulfide solid electrolyte described above.

The removal of the organic solvent can be performed by the same method as the "(Drying)" in the method for producing the sulfide solid electrolyte described above.

In addition, in the production method of the present embodiment, the "(Heating)" in the method for producing the sulfide solid electrolyte described above may be performed.

[Electrode Combined Material]

The electrode combined material of the present embodiment is an electrode combined material including the modified sulfide solid electrolyte of the present embodiment described above and an electrode active material, or an electrode combined material including the modified sulfide solid electrolyte of another aspect described above and an electrode active material.

(Electrode Active Material)

As the electrode active material, a positive electrode active material and a negative electrode active material are adopted depending on whether the electrode combined material is used for the positive electrode or the negative electrode.

As the positive electrode active material, any material can be used without particular limitation as long as it can promote a battery chemical reaction involving the movement of lithium ions caused by atoms, preferably lithium atoms, adopted as atoms for exhibiting ion conductivity in relation to the negative electrode active material. Examples of such a positive electrode active material capable of insertion and elimination of lithium ions include an oxide-based positive electrode active material and a sulfide-based positive electrode active material.

Preferred examples of the oxide-based positive electrode active material include lithium-containing transition metal composite oxides such as LMO (lithium manganate). LCO (lithium cobaltate), NMC (lithium nickel manganese cobaltate), NCA (lithium nickel cobalt aluminate), LNCO (lithium nickel cobaltate), and olivine type compounds ($LiMeNPO_4$, Me=Fe, Co, Ni, or Mn).

Examples of the sulfide-based positive electrode active material include titanium sulfide ($TiS_2$), molybdenum sulfide ($MoS_2$), iron sulfide (FeS, $FeS_2$), copper sulfide (CuS), and nickel sulfide ($Ni_3S_2$).

In addition to the positive electrode active material described above, niobium selenide ($NbSe_3$) or the like can also be used.

As the positive electrode active material, one kind can be used alone, or a plurality of kinds can be used in combination.

As the negative electrode active material, any material can be used without particular limitation as long as it can promote a battery chemical reaction involving the movement of lithium ions preferably caused by lithium atoms, such as a metal capable of forming an alloy with atoms adopted as atoms for exhibiting ion conductivity, preferably lithium atoms, an oxide thereof, and an alloy of the metal and lithium atoms. As such a negative electrode active material capable of insertion and elimination of lithium ions, those known as a negative electrode active material in the field of batteries can be adopted without limitation.

Examples of such a negative electrode active material include metals capable of forming metal lithium or an alloy with metal lithium, such as metal lithium, metal indium, metal aluminum, metal silicon, and metal tin, oxides of these metals, and alloys of these metals and metal lithium.

The electrode active material used in the present embodiment may have a coating layer in which a surface thereof is coated.

Examples of the material for forming the coating layer include an ion conductor such as a nitride, an oxide, or a composite thereof of an atom, preferably a lithium atom, which exhibits ion conductivity in the sulfide solid electrolyte. Specific examples thereof include a conductor having a LISICON type crystal structure such as $Li_{4-2x}Zn_xGeO_4$ having lithium nitride ($Li_3N$) or $Li_4GeO_4$ as a main structure, a conductor having a thio-LISICON type crystal structure such as $Li_{4-x}Ge_{1-x}P_xS_4$ having a $Li_3PO_4$ type skeleton structure, a conductor having a perovskite type crystal structure such as $La_{2/3-x}Li_{3x}TiO_3$, and a conductor having a NASICON type crystal structure such as $LiTi_2(PO_4)_3$.

In addition, examples thereof include lithium titanates such as $Li_yTi_{3-y}O^4$ ($0<y<3$) and $Li_4Ti_5O_{12}$ (LTO); lithium metal oxides of metals belonging to Group 5 of the periodic table, such as $LiNbO_3$ and $LiTaO_3$; and oxide-based conductors such as $Li_2O—B_2O_3—P_2O_5$-based conductors. $Li_2O—B_2O_3$—ZnO-based conductors, and $Li_2O—Al_2O_3—SiO_2—P_2O_5—TiO_2$-based conductors.

The electrode active material having a coating layer can be obtained, for example, by adhering a solution containing various atoms constituting the materials for forming the coating layer to the surface of the electrode active material, and firing the electrode active material after the adhesion preferably at 200° C., or higher and 400° C., or lower.

Here, as the solution containing various atoms, for example, a solution containing alkoxide of various metals such as lithium ethoxide, titanium isopropoxide, niobium isopropoxide, or tantalum isopropoxide may be used. In this case, as the solvent, an alcohol-based solvent such as ethanol or butanol, an aliphatic hydrocarbon solvent such as hexane, heptane, or octane, an aromatic hydrocarbon solvent such as benzene, toluene, or xylene, or the like may be used.

The adhesion may be performed by immersion, spray coating, or the like.

The firing temperature is preferably 200° C., or higher and 400° C., or lower, and more preferably 250° C., or higher and 390° C., or lower from the viewpoint of improving production efficiency and battery performance, and the firing time is usually about 1 minute to 10 hours, and preferably 10 minutes to 4 hours.

The coverage of the coating layer is preferably 90% or more, more preferably 95% or more, and still more preferably 100% based on the surface area of the electrode active material, that is, the entire surface is preferably coated. Further, the thickness of the coating layer is preferably 1 nm or more, and more preferably 2 nm or more, and the upper limit thereof is preferably 30 nm or less, and more preferably 25 nm or less.

The thickness of the coating layer can be measured by cross-sectional observation with a transmission electron microscope (TEM), and the coverage can be calculated from the thickness of the coating layer, an elemental analysis value, and a BET specific surface area.

(Other Components)

The electrode combined material of the present embodiment may contain other components such as a conductive material and a binder in addition to the modified sulfide solid electrolyte and the electrode active material described above. That is, the electrode combined material of the present embodiment may use other components such as a conductive material and a binder in addition to the modified sulfide solid electrolyte and the electrode active material described above. When the modified sulfide solid electrolyte and the electrode active material are mixed, other components such as the conductive agent and the binder may be further added to and mixed with the modified sulfide solid electrolyte and the electrode active material.

From the viewpoint of improving battery performance by improving electron conductivity, examples of the conductive material include carbon-based materials such as artificial graphite, graphite carbon fiber, resin-fired carbon, pyrolytic vapor-grown carbon, coke, mesocarbon microbeads, furfuryl alcohol resin-fired carbon, polyacene, pitch-based carbon fiber, vapor-grown carbon fiber, natural graphite, and non-graphitizing carbon.

By using the binder, the strength in a case where the positive electrode and the negative electrode are produced is improved.

The binder is not particularly limited as long as functions such as binding properties and flexibility can be imparted thereto, and examples thereof include various resins such as a fluorine-based polymer such as polytetrafluoroethylene and polyvinylidene fluoride, a thermoplastic elastomer such as butylene rubber and styrene-butadiene rubber, an acrylic resin, an acrylic polyol resin, a polyvinyl acetal resin, a polyvinyl butyral resin, and a silicone resin.

The blending ratio (mass ratio) of the electrode active material and the modified sulfide solid electrolyte in the electrode combined material is preferably 99.5:0.5 to 40:60, more preferably 99:1 to 50:50, and still more preferably 98:2 to 60:40, in order to improve battery performance and in consideration of production efficiency.

In a case where the conductive material is contained, the content of the conductive material in the electrode combined material is not particularly limited, and is preferably 0.5% by mass or more, more preferably 1% by mass or more, and still more preferably 1.5% by mass or more in order to improve battery performance and in consideration of production efficiency, and the upper limit thereof is preferably 10% by mass or less, preferably 8% by mass or less, and still more preferably 5% by mass or less.

In addition, in a case where the binder is contained, the content of the binder in the electrode combined material is not particularly limited, but is preferably 1% by mass or more, more preferably 3% by mass or more, and still more preferably 5% by mass or more in order to improve battery performance and in consideration of production efficiency, and the upper limit thereof is preferably 20% by mass or less, preferably 15% by mass or less, and still more preferably 10% by mass or less.

[Lithium-Ion Battery]

The lithium-ion battery of the present embodiment is a lithium-ion battery including at least one selected from the modified sulfide solid electrolyte of the present embodiment and the electrode combined material described above, and including at least one selected from the modified sulfide solid electrolyte of another aspect and the electrode combined material described above.

The configuration of the lithium-ion battery of the present embodiment is not particularly limited as long as the lithium-ion battery includes any one of the modified sulfide solid electrolyte of the present embodiment, the electrode combined material including this modified sulfide solid electrolyte, the modified sulfide solid electrolyte of another aspect, and the electrode combined material including this modified sulfide solid electrolyte. The lithium-ion battery may have a configuration of a general-purpose lithium-ion battery.

The lithium-ion battery of the present embodiment preferably includes, for example, a positive electrode layer, a negative electrode layer, an electrolyte layer, and a current collector. It is preferable that the electrode combined material of the present embodiment is used as the positive electrode layer and the negative electrode layer, and it is preferable that the modified sulfide solid electrolyte of the present embodiment or the modified sulfide solid electrolyte of another aspect is used as the electrolyte layer.

In addition, a known current collector may be used as the current collector. For example, a layer obtained by coating a material that reacts with the solid electrolyte, such as Au, Pt, Al, Ti, or Cu, with Au or the like can be used.

EXAMPLES

Next, the present invention will be specifically described by Examples, but the present invention is not limited by these Examples at all.

Production Example: Preparation of Sulfide Solid Electrolyte

Into a Schlenk flask (capacity: 100 mL) with a stirring bar under a nitrogen atmosphere, 0.59 g of lithium sulfide, 0.95 g of diphosphorus pentasulfide, 0.19 g of lithium bromide, and 0.28 g of lithium iodide were introduced. After the stirring bar was rotated, 20 ml of tetramethylethylenediamine (TMEDA) as a complexing agent was added, stirring was continued for 12 hours, and the obtained complex-containing material was dried under vacuum (room temperature: 23° C.) to obtain a powdery complex. Next, the powder of the complex was heated under vacuum at 120° C., for 2 hours to obtain an amorphous sulfide solid electrolyte. Further, the amorphous sulfide solid electrolyte was heated under vacuum at 140° C., for 2 hours to obtain a crystalline sulfide solid electrolyte 1 (the heating temperature for obtaining the crystalline sulfide solid electrolyte (140° C., in this example) may be referred to as a "crystallizing temperature").

When the BET specific surface areas of the obtained amorphous sulfide solid electrolyte and the obtained crystalline sulfide solid electrolyte were measured, they were both 40 $m^2/g$.

Example 1

Three grams of the crystalline sulfide solid electrolyte obtained in Production Example was weighed and added to a Schlenk flask (capacity: 100 mL) with a stirring bar under a nitrogen atmosphere, 22 g of toluene was added and stirred to obtain a fluid in a slurry. Ethylene glycol diglycidyl ether (polyfunctional epoxy compound 1, in the general formula (1), $X^1$ is a single bond, and $n_1$ is 2) as a polyfunctional epoxy compound was further added to the fluid in a slurry in an amount of 0.30 g (10 parts by mass relative to 100 parts by mass of the crystalline sulfide solid electrolyte), the mixture was stirred for 10 minutes, and then toluene was distilled off by vacuum drying to obtain a modified sulfide solid electrolyte.

For the obtained modified sulfide solid electrolyte, the oil absorption and the ion conductivity were measured using the following methods. In addition, the reduction rate of the oil absorption was calculated using the following method. The measurement results and calculation results are shown in Table 1. Further, when FT-IR spectroscopy (ATR method) was performed using the following method, it was found that the infrared absorption spectrum had a peak at 2800 to 3000 $cm^{-1}$. In addition, when $^1H$-NMR measurement was performed using the following method, it was also demonstrated that the $^1H$-NMR spectrum had a peak of 0.0 to 5.0 ppm derived from an alkyl chain.

Examples 2 to 29

Modified sulfide solid electrolytes were prepared in the same manner as in Example 1 except that the type of the polyfunctional epoxy compound was changed to those shown in Table 1.

For the obtained modified sulfide solid electrolyte, the oil absorption and the ion conductivity were measured using the following methods. In addition, the reduction rate of the oil absorption was calculated using the following method. The measurement results and calculation results are shown in Table 1. Further, when FT-IR spectroscopy (ATR method) was performed using the following method, it was found that the infrared absorption spectrum had a peak at 2800 to 3000 $cm^{-1}$. In addition, when $^1H$-NMR measurement was performed using the following method, it was also demonstrated that the $^1H$-NMR spectrum had a peak of 0.0 to 5.0 ppm derived from an alkyl chain.

Comparative Example 1

For the sulfide solid electrolyte obtained in Production Example, the oil absorption and the ion conductivity were measured using the following methods. In addition, the reduction rate of the oil absorption was calculated using the following method. The measurement results and calculation results are shown in Table 1. The oil absorption of the sulfide solid electrolyte was 1.03 mL/g.

Further, when FT-IR spectroscopy (ATR method) was performed using the following method, a peak could not be found at 2800 to 3000 $cm^{-1}$ in the infrared absorption spectrum. In addition, when $^1H$-NMR measurement was performed using the following method, a peak of 0.0 to 5.0 ppm derived from an alkyl chain could not be found.

(Measurement of Specific Surface Area)

The specific surface area was measured according to a BET method with krypton (Kr) adsorption using a gas adsorption measuring device.

(Measurement of Oil Absorption)

One gram of the solid electrolyte obtained in Examples and Comparative Examples was used as a sample, and an operation of adding one drop of butyl butyrate using a dropper and stirring with a spatula was performed in an agate mortar, and this operation was repeated until the sample became a paste, and the total amount of added butyl butyrate was defined as the oil absorption (mL/g).

(Reduction Rate of Oil Absorption)

In the same manner as in the above (Measurement of Oil Absorption), the oil absorption of the sulfide solid electrolyte obtained in Production Example was measured. Using the oil absorption A of the sulfide solid electrolyte and the oil absorption B of each of the sulfide solid electrolytes obtained in Examples and Comparative Example by the above (Measurement of Oil Absorption), a numerical value calculated by the following formula was defined as the reduction rate of the oil absorption.

$$\text{Reduction rate of oil absorption}=(\text{oil absorption } A-\text{oil absorption } B)/(\text{oil absorption } A)\times 100(\%)$$

(Measurement of Ion Conductivity)

In this example, the ion conductivity was measured as follows.

A circular pellet having a diameter of 10 mm (cross-sectional area S: 0.785 $cm^2$) and a height (L) of 0.1 to 0.3 cm was formed from the sulfide solid electrolyte and used as a sample. Electrode terminals were attached to the top and bottom of the sample, and measurement was performed by an alternating current impedance method at 25° C. (range of frequencies: 1 MHz to 100 Hz, amplitudes: 10 mV) to obtain a Cole-Cole plot. The real part Z' (Ω) at a point where-Z" (Ω) is minimum near the right end of the arc observed in the high-frequency side region was set as the bulk resistance R (Ω) of the electrolyte, and the ion conductivity σ (S/cm) was calculated according to the following equation.

$$R=\rho(L/S)$$

$$\sigma=1/\rho$$

(FT-IR Spectroscopy (ATR Method))

Measurement apparatus: FT-IR spectrometer "VERTEX70v (model number)", manufactured by Bruker Measurement method: attenuated total reflection method (ATR method)

Measurement wavenumber range: 650 to 4000 $cm^{-1}$

Illuminant: Globar lamp (SiC)

Detector: DTGS detector

Resolution: 4 $cm^{-1}$

Measurement time: 1 second/time

Number of integrations: 256

Measurement conditions: A diamond prism was used and irradiation was performed at an incident angle of 45°.

($^1H$-NMR Measurement)

Nuclear magnetic resonance apparatus (NMR apparatus): AVANCE III HD (manufactured by BRUKER Co., Ltd.)

Observation nucleus: 1H

Resonance frequencies: 500 MHZ

Probe: 5 mmϕ TCI cryoprobe

Measurement temperature: 25° C.

Number of integrations: 16

TABLE 1

| | | Specific surface area [m²/g] | Heteropolycyclic compound | Content [% by mass] | Oil absorption [mL/g] | Oil absorption reduction rate [%] | Ion conductivity [mS/cm] |
|---|---|---|---|---|---|---|---|
| Example | 1 | 40 | 1 | 10 | 0.90 | 13 | 0.63 |
| | 2 | 40 | 2 | 10 | 0.83 | 19 | 0.52 |
| | 3 | 40 | 3 | 10 | 0.88 | 15 | 0.50 |
| | 4 | 40 | 4 | 10 | 0.83 | 19 | 0.61 |
| | 5 | 40 | 5 | 10 | 0.90 | 13 | 0.75 |
| | 6 | 40 | 6 | 10 | 0.87 | 16 | 0.78 |
| | 7 | 40 | 7 | 10 | 0.90 | 13 | 0.85 |
| | 8 | 40 | 8 | 10 | 0.89 | 14 | 0.84 |
| | 9 | 40 | 9 | 10 | 0.88 | 15 | 0.69 |
| | 10 | 40 | 10 | 10 | 0.84 | 18 | 0.94 |
| | 11 | 40 | 11 | 10 | 0.85 | 17 | 0.78 |
| | 12 | 40 | 12 | 10 | 0.78 | 24 | 0.79 |
| | 13 | 40 | 13 | 10 | 0.82 | 20 | 0.58 |
| | 14 | 40 | 14 | 10 | 0.88 | 15 | 0.61 |
| | 15 | 40 | 15 | 10 | 0.90 | 13 | 0.59 |
| | 16 | 40 | 16 | 10 | 0.78 | 24 | 0.56 |
| | 17 | 40 | 17 | 10 | 0.80 | 22 | 0.52 |
| | 18 | 40 | 18 | 10 | 0.90 | 13 | 0.50 |
| | 19 | 40 | 19 | 10 | 0.84 | 18 | 1.65 |
| | 20 | 40 | 20 | 10 | 0.80 | 22 | 1.06 |
| | 21 | 40 | 21 | 10 | 0.84 | 17 | 0.51 |
| | 22 | 40 | 22 | 10 | 0.90 | 13 | 0.57 |
| | 23 | 40 | 23 | 10 | 0.85 | 17 | 0.58 |
| | 24 | 40 | 24 | 10 | 0.90 | 13 | 0.55 |
| | 25 | 40 | 25 | 10 | 0.90 | 13 | 0.51 |
| | 26 | 40 | 26 | 10 | 0.90 | 13 | 0.59 |
| | 27 | 40 | 27 | 10 | 0.90 | 13 | 0.55 |
| | 28 | 40 | 28 | 10 | 0.83 | 19 | 0.65 |
| | 29 | 40 | 29 | 10 | 0.90 | 13 | 0.54 |
| Comparative Example | 1 | 40 | — | — | 1.03 | — | 3.05 |

The details of the polyfunctional epoxy compounds shown in Table 1 are as follows.

Heteropolycyche compound 1: ethylene glycol diglycidyl ether, in the above general formula (1). $X^1$ is a single bond and $n_1$ is 2. The structural formula is as follows.

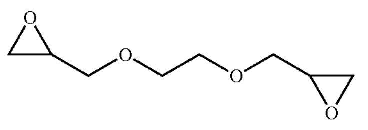

Heteropolycyclic compound 2:1,4-butanediol diglycidyl ether, in the above general formula (1), $X^1$ is an ethylene group and $n_1$ is 2. The structural formula is as follows.

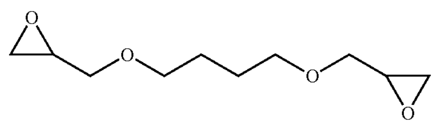

Heteropolycyclic compound 3:1,6-hexanediol diglycidyl ether, in the above general formula (1), $X^1$ is a butylenes group and $n_1$ is 2. The structural formula is as follows.

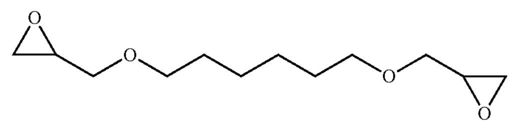

Heteropolycyclic compound 4: neopentyl glycol diglycidyl ether, in the above general formula (1), $X^1$ is a neopentylene group (the basic structure of $X^1$ is neopentane), and $n_1$ is 2. The structural formula is as follows.

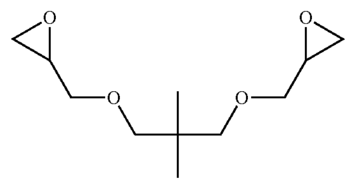

Heteropolycyclic compound 5: diethylene glycol diglycidyl ether, in the above general formula (1), $X^1$ is a group in which two ethylene groups are bonded via —O— (the basic structure of $X^1$ is diethylene glycol), and $l_1$ is 2. The structural formula is as follows.

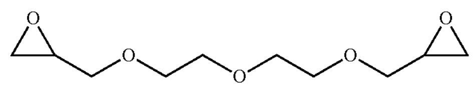

Heteropolycyclic compound 6:1,4-cyclohexanedimethanol diglycidyl ether, in the above general formula (1), $X^1$ is a 1,4-dimethylcyclohexylene group (the basic structure of $X^1$ is 1,4-dimethylcyclohexane), and $n_1$ is 2. The structural formula is as follows.

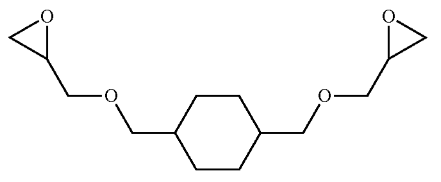

Heteropolycyclic compound 7: diglycidyl resorcinol ether, in the above general formula (1), $X^1$ is a 1,3-phenylene group (the basic structure of $X^1$ is benzene), and $n_1$ is 2. The structural formula is as follows.

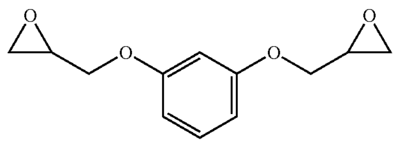

Heteropolycyclic compound 8:1,4-diglycidyloxybenzene, in the above general formula (1), $X^1$ is a 1,4-phenylene group (the basic structure of $X^1$ is benzene), and $n_1$ is 2. The structural formula is as follows.

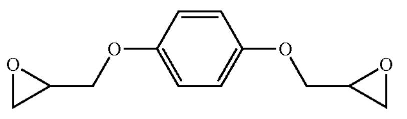

Heteropolycyclic compound 9: bisphenol-A diglycidyl ether, in the above general formula (1), $X^1$ is a group obtained by removing hydrogen atoms from hydroxy groups of bisphenol-A which is the basic structure, and $m_1$ is 2. The structural formula is as follows.

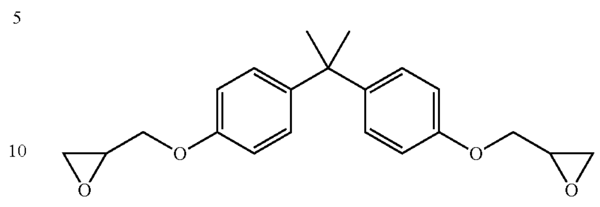

Heteropolycyclic compound 10:9,9-bis(4-glycidyloxyphenyl) fluorene, in the above general formula (1), $X^1$ is a group obtained by removing hydrogen atoms from 9,9-bis(4-hydroxyphenyl) fluorene which is the basic structure, and $m_1$ is 2. The structural formula is as follows.

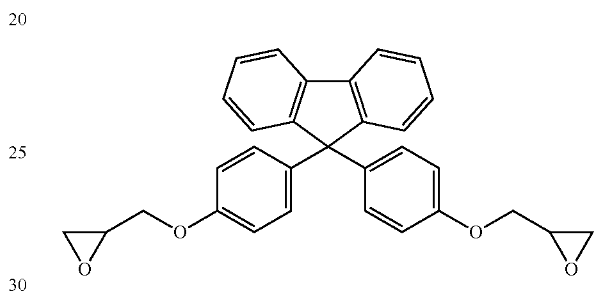

Heteropolycyclic compound 11: bisphenol A propoxylate diglycidyl ether, in the above general formula (1), $X^1$ is a group obtained by removing hydrogen atoms from propyl groups of a compound (2,2-bis(4-propoxyphenyl) propane) in which a hydrogen atom of hydroxy groups of bisphenol A which is the basic structure are substituted with propyl groups, and $m_1$ is 2. The structural formula is as follows.

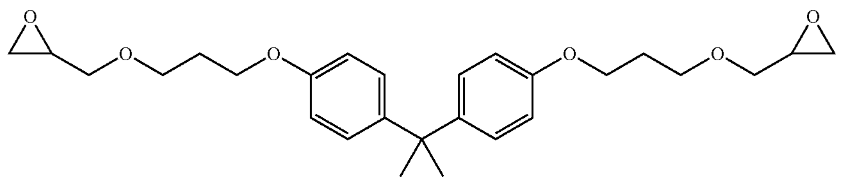 [SMILES: CC(C)(c1ccc(OCCCOCC2CO2)cc1)c1ccc(OCCCOCC2CO2)cc1]

Heteropolycyclic compound 12:1,3-bis(3-glycidyloxypropyl)tetramethyldisiloxane, in the above general formula (1), $X^1$ is a group obtained by removing hydrogen atoms from propyl groups of 1,3-dipropyl-1,1,3,3-tetramethyldisiloxane which is the basic structure, and $n_1$ is 2. The structural formula is as follows.

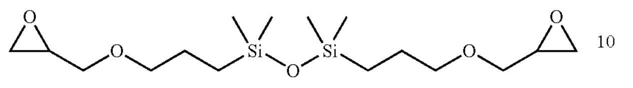

Heteropolycyclic compound 13: trimethylolpropane triglycidyl ether, in the above general formula (1), $X^1$ is a group obtained by removing hydrogen atoms from 2,2-dimethylbutane which is the basic structure, and $n_1$ is 3. The structural formula is as follows.

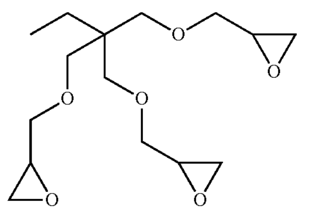

Heteropolycyclic compound 14: tris(4-hydroxyphenyl) methane triglycidyl ether, in the above general formula (1), $X^1$ is a group obtained by removing hydrogen atoms from hydroxy groups of methylidine trisphenol which is the basic structure, and $m_1$ is 3. The structural formula is as follows.

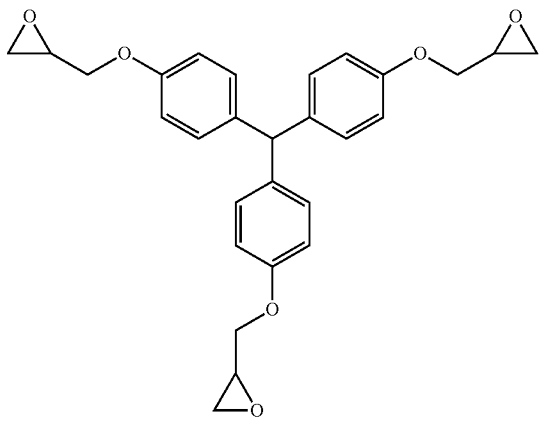

Heteropolycyclic compound 15:2,4,6,8-tetramethyl-2,4,6,8-tetrakis(propyl glycidyl ether)cyclotetrasiloxane, in the above general formula (1), $X^1$ is a group obtained by removing hydrogen atoms from propyl groups of 2,4,6,8-tetramethyl-2,4,6,8-tetrapropylcyclotetrasiloxane which is the basic structure, and $n_1$ is 4. The structural formula is as follows.

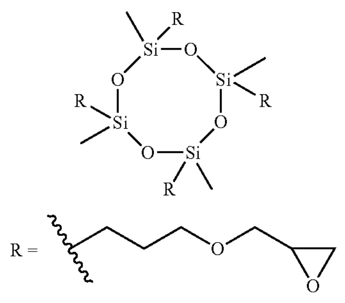

Heteropolycyclic compound 16:1,3-butadiene diepoxide, in the above general formula (1), $X^1$ is a single bond and $l_1$ is 2. The structural formula is as follows.

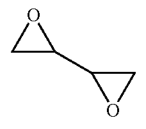

Heteropolycyclic Compound 17:1,5-hexadiene diepoxide, in the above general formula (1), $X^1$ is an ethylene group and $m_1$ is 2. The structural formula is as follows.

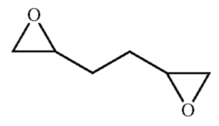

Heteropolycyclic compound 18:1,7-octadiene diepoxide, in the above general formula (1), $X^1$ is a butylene group and $m_1$ is 2. The structural formula is as follows.

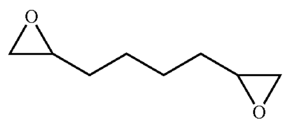

Heteropolycyclic compound 19:2,2'-(2,2,3,3,4,4,5,5-octafluorohexane-1,6-diyl)bisoxirane, in the above general formula (1), $X^1$ is a 2,2,3,3,4,4,5,5-octafluorohexane-1,6-diyl group (the basic structure of $X^1$ is 2,2,3,3,4,4,5,5-octafluorohexane), and $l_1$ is 2. The structural formula is as follows.

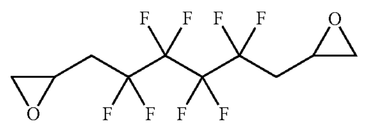

Heteropolycyclic compound 20:1,3-bis[2-(7-oxabicyclo[4.1.0]heptan-3-yl)ethyl]-1,1,3,3-tetramethyldisiloxane, in the above general formula (1), the basic structure of $X^1$ is 1,3-ethylhexyl-1,1,3,3-tetramethyldisiloxane, $l_1$ is 2, and an epoxy group is condensed with cyclohexane to be present as epoxycyclohexane. The structural formula is as follows.

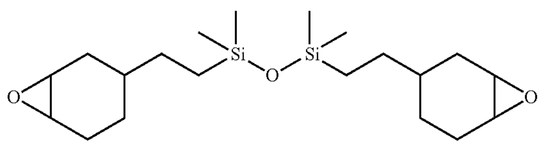

Heteropolycyclic compound 21: N,N-diglycidyl-4-glycidyloxyaniline, in the above general formula (1), the basic structure of $X^1$ is 4-hydroxyaniline, and $m_1$ is 3. The structural formula is as follows.

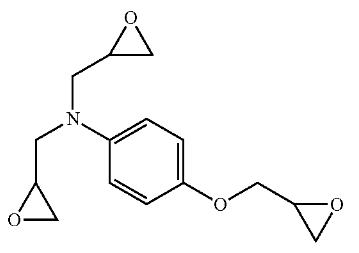

Heteropolycyclic compound 22:4,4'-methylenebis(N,N-diglycidylaniline), in the above general formula (1), the basic structure of $X^1$ is 4,4'-methylenebis(N,N-dimethylaniline), and $m_1$ is 4. The structural formula is as follows.

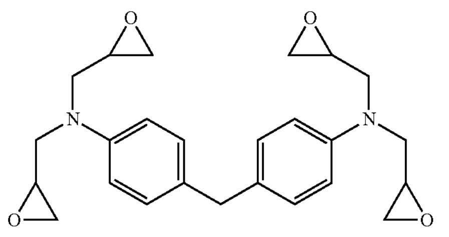

Heteropolycyclic compound 23: polypropylene glycol diglycidyl ether (number average molecular weight: 380), in the above general formula (1), $X^1$ is a group of a repeating unit represented by —$R^1$O—($R^1$ is a propylene group) in which a plurality of aliphatic groups (propylene groups) are bonded via —O—, $m_1$ is 1, and $m_1$ is 1. The structural formula is as follows (in the structural formula, n is the average number of repetitions).

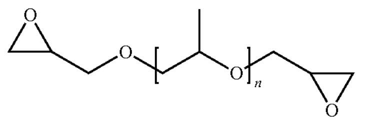

Heteropolycyclic compound 24: polyethylene glycol diglycidyl ether (number average molecular weight: 500), in the above general formula (1), $X^1$ is a group of a repeating unit represented by —$R^1$O—($R^1$ is an ethylene group) in which a plurality of aliphatic groups (ethylene groups) are bonded via —O—, $m_1$ is 1, and $m_1$ is 1. The structural formula is as follows (in the structural formula, n is the average number of repetitions).

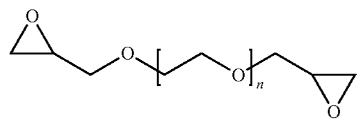

Heteropolycyclic compound 25: polyethylene glycol diglycidyl ether (number average molecular weight: 2000), in the above general formula (1), $X^1$ is a group of a repeating unit represented by —R'O—($R^1$ is an ethylene group) in which a plurality of aliphatic groups (ethylene groups) are bonded via —O—, $m_1$ is 1, and $n_1$ is 1. The structural formula is as follows (in the structural formula, n is the average number of repetitions).

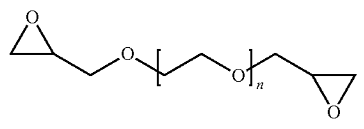

Heteropolycyclic compound 26: polyethylene glycol diglycidyl ether (number average molecular weight: 6000), in the above general formula (1), $X^1$ is a group of a repeating unit represented by —R'O—($R^1$ is an ethylene group) in which a plurality of aliphatic groups (ethylene groups) are bonded via —O—, $m_1$ is 1, and $n_1$ is 1. The structural formula is as follows (in the structural formula, n is the average number of repetitions).

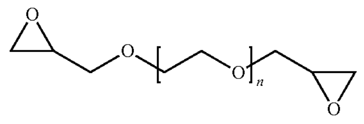

Heteropolycyclic compound 27: pentaerythritol glycidyl ether, in the above general formula (1), the basic structure of $X^1$ is pentaerithritol, and m; is 4 (or it can be said that $X^1$ is a group obtained by removing four hydrogen atoms from 2,2-dimethylbutane which is the basic structure, and $n_1$ is 4). The structural formula is as follows.

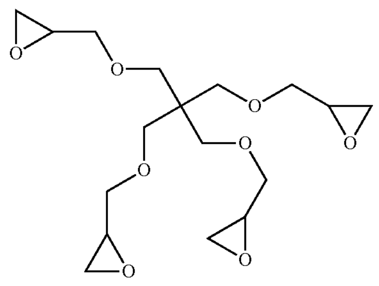

Heteropolycyclic compound 28:1,4-bis(2-tetrahydrofuryloxy) butane, in the above general formula (2), $X^2$ is a 1,4-butanediyrdioxy group, $R^{2a}$ in the heterocyclic ring is a butylene group, and 12 is 2 (or it can be said that $X^2$ is a group obtained by removing two hydrogen atoms from 1,4-butanediol which is the basic structure, $R^{2a}$ in the heterocyclic ring is a butylene group, and 12 is 2). The structural formula is as follows.

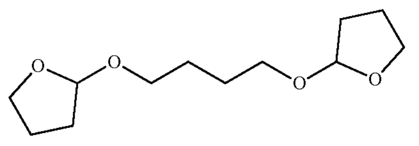 [SMILES: C(CCOC1CCCO1)COC1CCCO1]

Heteropolycyclic compound 29: PSS-octa[(3-glycidyloxypropyl)dimethylsiloxy] substituted, in the above general formula (1), $X^1$ is a group obtained by removing hydrogen atoms (eight hydrogen atoms in total) from a propyl group in a compound (PSS-octa[propyldimethylsiloxy] substituted) in which one propyldimethylsiloxy group (eight in total) is bonded to each of eight silicon atoms of a PSS-octamethyl substituted which is the basic structure, and $n_1$ is 8. The structural formula is as follows.

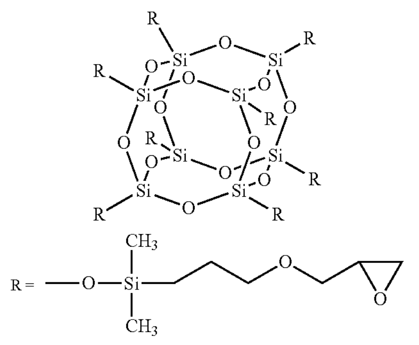

From the Examples, it was demonstrated that the modified sulfide solid electrolytes of the present embodiment all had an oil absorption of 0.9 mL/g or less and a reduction rate of the oil absorption of 13% or more, and thus had a small oil absorption and excellent coating suitability in spite of having a large specific surface area of 10 $m^2/g$ or more. In addition, it was also demonstrated that the modified sulfide solid electrolytes of the present embodiment had an ion conductivity of 0.5 mS/cm or more.

On the other hand, the sulfide solid electrolyte of Comparative Example 1 which is not mixed with a polyfunctional epoxy compound and does not contain a polyfunctional epoxy compound is the sulfide solid electrolyte produced in Production Example, and is the conventional sulfide solid electrolyte itself. It was demonstrated that the sulfide solid electrolyte having a specific surface area of 40 $m^2/g$ or more in Comparative Example 1 had an oil absorption of as high as 1.03 mL/g and was inferior in coating suitability. That is, it was demonstrated that the method for producing modified sulfide solid electrolytes of the present embodiment is suitable for those having a large specific surface area of 10 $m^2/g$ or more because the method can exhibit the effect of reducing the oil absorption and improving the coating suitability.

Example 30

The modified sulfide solid electrolytes obtained in the above Examples were examined below to confirm whether the polyfunctional epoxy compound was adhered to the sulfide solid electrolyte.

First, toluene was added to the modified sulfide solid electrolyte obtained in Example 9 in which the content of the polyfunctional epoxy compound 9 (bisphenol A diglycidyl ether) was 9.1% by mass (the amount of the polyfunctional epoxy compound 9 used was 10 parts by mass relative to 100 parts by mass of the sulfide solid electrolyte) to form a slurry (slurry concentration: 12% by mass), and then the slurry was left to stand for 24 hours. A supernatant liquid generated by sedimentation of the sulfide solid electrolyte was collected and analyzed by gas chromatography mass spectrometry (GC/MS method). In the quantification in this analysis, the charged liquid (1.1% by mass toluene solution of the polyfunctional epoxy compound 9) was also analyzed in the same manner as the supernatant liquid, and the peak area of the poly functional epoxy compound 9 in the charged liquid was set to 1 and compared with the peak area of the polyfunctional epoxy compound 9 remaining in the supernatant liquid (the closer the peak area of the supernatant liquid to 1, the more the polyfunctional epoxy compound was liberated from the sulfide solid electrolyte and dissolved in toluene). According to the analysis, the polyfunctional epoxy compound was not detected in the supernatant liquid. Therefore, it is considered that the polyfunctional epoxy compound was fully adhered to the sulfide solid electrolyte.

(Gas Chromatography Mass Spectrometry Conditions)

Gas chromatography: 6890B (manufactured by Agilent)

Analytical column: HP-5 ms (manufactured by Agilent)

GC oven temperature rise conditions:

Initial temperature 50° C.

Temperature rise from 50° C., to 300° C., at 10° C./min.

Hold at 300° C., for 5 minutes

Sample injection amount: 1 μL

In addition, the precipitated sulfide solid electrolyte was washed by repeating three times a step of adding toluene to the precipitated sulfide solid electrolyte, stirring the mixture, allowing the mixture to stand for 12 hours, and removing the supernatant. After washing, the sulfide solid electrolyte obtained by drying the toluene was dissolved in deuterated methanol and subjected to $^1$H-NMR measurement by the above-described method, and as a result, a chemical shift of a group derived from a polyfunctional epoxy compound (an alkyl group or the like) was detected.

(CV Measurement (Oxidation Current))

In order to evaluate the oxidation current, the following cell for CV measurement was used.

A total of 100 mg (sulfide solid electrolyte: DENKA BLACK (mass ratio)=85:15) of the sulfide solid electrolyte obtained in each of Examples and Comparative Examples and a DENKA BLACK granular product (particle size: 35 nm, manufactured by Denka Company Limited) was mixed using a mortar for 10 minutes, thereby obtaining a measurement powder (1).

To a battery cell having a diameter of 10 mm, 100 mg of an electrolyte for a separator layer was added, and the mixture was pressed three times using a SUS mold at 10 $MPa/cm^2$ while rotating 120° at a time, and then 10 mg of the measurement powder (1) was added thereto, and the mixture was pressed three times at 20 $MPa/cm^2$ while rotating 120° at a time. Next, from the side opposite to the measurement powder (1), the mixture was pressed three times at 20 $MPa/cm^2$ while rotating 120° at a time.

The electrolyte for the separator described above was synthesized under the following conditions.

Into a 1 L reactor container equipped with a stirring blade, 20.5 g of $Li_2S$, 33.1 g of $P_2S_5$, 10.0 g of LiI, and 6.5 g of LiBr were added under a nitrogen atmosphere. After rotating the stirring blade, 630 g of toluene was introduced and the slurry was stirred for 10 minutes. The reactor container was connected to a beads mill ("STARMILL LMZ015 (trade name)", manufactured by Ashizawa Finetech Ltd., beads material: zirconia, bead diameter: 0.5 mmϕ, amount of beads used: 456 g) capable of circulating operation, and a pulverization treatment (pump flow rate: 650 mL/min, bead mill circumferential speed: 12 m/s, mill jacket temperature: 45° C.) was performed for 45 hours.

The obtained slurry was dried at room temperature (25° C.) under vacuum and then heated (80° C.) to obtain a white powder of amorphous solid electrolyte. Further, the obtained white powder was heated at 195° C., under vacuum for 2 hours to obtain a white powder of crystalline solid electrolyte. In the XRD spectrum of the crystalline solid electrolyte, crystallization peaks were detected at 2θ=20.2° and 23.6°, and it was demonstrated that the crystalline solid electrolyte had a thio-LISICON Region II type crystal structure. In addition, the obtained crystalline solid electrolyte had an average particle diameter ($D_{50}$) of 4.5 μm and an ion conductivity of 5.0 mS/cm.

An InLi foil (having a layer structure, in which "/" represents between layers; In: 10 mmϕ×0.1 mm/Li: 9 mmϕ×0.08 mm/SUS: 10 mmϕ×0.1 mm) was provided on the side opposite to that of the measurement powder (1) of the electrolyte for the separator layer, and pressed once at 6 MPa/cm$^2$. The cell was fixed by four screws sandwiching an insulator so as not to cause a short circuit between the measurement powder (1) and the InLi foil, and the screws were fixed at a torque of 8N·m to obtain a measurement cell.

The obtained measurement cell was connected to a measuring instrument ("VMP-300 (model number)" manufactured by BioLogic), and a CV curve was obtained under the following conditions.

Measurement temperature: 25° C.

Sweep rate: 0.1 mV/s

Potential measurement range: open circuit voltage (+2.1 V)→+5.0 V→+2.1 V

Cycle number: 2 times

The modified sulfide solid electrolyte of Example 2 and the sulfide solid electrolyte of Comparative Example 1 were subjected to CV measurement using the above-described method. The CV curve at the first cycle is shown in FIG. 1. According to the CV curve of FIG. 1, it was observed that the modified sulfide solid electrolyte of Example 2 had a lower oxidation current than that of Comparative Example 1. In addition, in Examples 9, 11, and 13, a decrease in the oxidation current was also observed as compared with Comparative Example 1 (FIG. 1). Although not shown, in all of Examples 1 to 29, a decrease in the oxidation current was observed as compared with Comparative Example 1. From the above, it was found that the oxidation reaction occurring at the interface between the electrolyte and the conductive material can be suppressed by the coating with the epoxy compound.

INDUSTRIAL APPLICABILITY

The modified sulfide solid electrolyte of the present embodiment has excellent coating suitability when coated as a paste and can efficiently exhibit excellent battery performance, even when using a sulfide solid electrolyte with a large specific surface area. In addition, since the modified sulfide solid electrolyte of the present embodiment has high ion conductivity, the modified sulfide solid electrolyte is suitably used for a battery, particularly, a battery used for an information-related device or a communication device such as a personal computer, a video camera, or a mobile phone.

The invention claimed is:

1. A modified sulfide solid electrolyte comprising: a sulfide solid electrolyte having a BET specific surface area of 10 m$^2$/g or more and containing a lithium atom, a sulfur atom, a phosphorus atom, and a halogen atom; and a compound having two or more heterocyclic rings each having a carbon atom and an oxygen atom, wherein the compound having two or more heterocyclic rings each having a carbon atom and an oxygen atom is a compound having two or more groups each having an oxirane ring.

2. The modified sulfide solid electrolyte according to claim 1, wherein the compound having two or more heterocyclic rings each having a carbon atom and an oxygen atom is an epoxy compound represented by the following general formula (1) and having at least two or more groups selected from an epoxy group, a glycidyl group, and a glycidyl ether group:

(1)

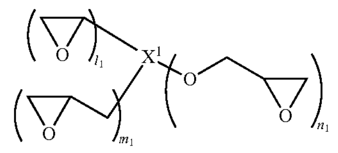

wherein, $X^1$ is a single bond or an aliphatic group, an alicyclic group, an aromatic group, an organic group having a siloxane structure, or an organic group composed of a combination thereof; $l_1$, $m_1$, and $n_1$ are each an integer of 0 or more and 16 or less, and satisfy $l_1+m_1+n_1 \geq 2$; and when the organic group of $X^1$ has the alicyclic group, the epoxy group may be condensed with an alicyclic ring in the alicyclic group.

3. The modified sulfide solid electrolyte according to claim 2, wherein the group composed of a combination thereof, which is a $X^1$ in the general formula (1), is a group formed by bonding at least two groups selected from the aliphatic group, the alicyclic group, the aromatic group, and the organic group having a siloxane structure by a single bond or a bonding group selected from —O—, —$SO_2$—, —CO—, —C(—O)O—, —N—, and —S—.

4. The modified sulfide solid electrolyte according to claim 1, which has a peak at 2800 to 3000 cm-1 in an infrared absorption spectrum obtained by FT-IR spectroscopy (ATR method).

5. The modified sulfide solid electrolyte according to claim 4, wherein the peak is derived from C—H stretching vibration of an alkyl chain in the epoxy compound.

6. The modified sulfide solid electrolyte according to claim 5, which has a peak of 0.0 to 5.0 ppm derived from the alkyl chain in a 1H-NMR spectrum.

7. The modified sulfide solid electrolyte according to claim 1, wherein a content of the compound having two or more heterocyclic rings each having a carbon atom and an oxygen atom is 0.03 parts by mass or more and 25 parts by mass or less relative to 100 parts by mass of the sulfide solid electrolyte.

8. The modified sulfide solid electrolyte according to claim 1, wherein the compound having two or more heterocyclic rings each having a carbon atom and an oxygen atom has a number average molecular weight of 10,000 or less.

9. The modified sulfide solid electrolyte according to claim 1, wherein a content of the compound having two or more heterocyclic rings each having a carbon atom and an oxygen atom and having a number average molecular weight of 10,000 or less in the compound having two or more heterocyclic rings each having a carbon atom and an oxygen atom is 90% by mass or more.

10. The modified sulfide solid electrolyte according to claim 1, wherein a content of the compound having two or more heterocyclic rings each having a carbon atom and an oxygen atom and having a number average molecular weight of more than 10,000 in the compound having two or more heterocyclic rings each having a carbon atom and an oxygen atom is 10% by mass or less.

11. An electrode combined material comprising the modified sulfide solid electrolyte according to claim 1 and an electrode active material.

12. A lithium-ion battery comprising the modified sulfide solid electrolyte according to claim 1.

13. A method for producing a modified sulfide solid electrolyte, the method comprising: mixing a sulfide solid electrolyte having a BET specific surface area of 10 $m^2/g$ or more and containing a lithium atom, a sulfur atom, a phosphorus atom, and a halogen atom, a compound having two or more heterocyclic rings each having a carbon atom and an oxygen atom, and an organic solvent; and removing the organic solvent, wherein the compound having two or more heterocyclic rings each having a carbon atom and an oxygen atom is a compound having two or more groups each having an oxirane ring.

14. The method for producing a modified sulfide solid electrolyte according to claim 13, wherein the organic solvent is at least one solvent selected from an aliphatic hydrocarbon solvent, an alicyclic hydrocarbon solvent, an aromatic hydrocarbon solvent, an ether solvent, an ester solvent, and a nitrile solvent.

* * * * *